US007953000B2

(12) United States Patent
Baker et al.

(10) Patent No.: US 7,953,000 B2
(45) Date of Patent: May 31, 2011

(54) MECHANISM TO IMPROVE PREEMPTION BEHAVIOR OF RESOURCE RESERVATIONS

(75) Inventors: Frederick Baker, Santa Barbara, CA (US); Bruce S. Davie, Cambridge, MA (US); David R. Oran, Acton, MA (US); Carol Iturralde, Framingham, MA (US); Roger Levesque, Tewksbury, MA (US); Michael V. DiBiasio, Westford, MA (US)

(73) Assignee: Cisco Technology, Inc., San Jose, CA (US)

( * ) Notice: Subject to any disclaimer, the term of this patent is extended or adjusted under 35 U.S.C. 154(b) by 1278 days.

(21) Appl. No.: 10/938,837

(22) Filed: Sep. 10, 2004

(65) Prior Publication Data

US 2006/0056291 A1    Mar. 16, 2006

(51) Int. Cl.
*H04L 12/28* (2006.01)
(52) U.S. Cl. ........................................ 370/230; 709/226
(58) Field of Classification Search .................. None
See application file for complete search history.

(56) References Cited

U.S. PATENT DOCUMENTS

| | | | | |
|---|---|---|---|---|
| 6,606,301 | B1 * | 8/2003 | Muller et al. ................. | 370/230 |
| 7,035,202 | B2 * | 4/2006 | Callon ........................... | 370/216 |
| 7,453,801 | B2 * | 11/2008 | Taneja et al. .................. | 370/230 |
| 7,536,192 | B2 * | 5/2009 | O'Neill ......................... | 455/509 |
| 2002/0141345 | A1 * | 10/2002 | Szviatovszki et al. ....... | 370/238 |
| 2003/0152029 | A1 * | 8/2003 | Couturier ...................... | 370/235 |
| 2003/0191828 | A1 * | 10/2003 | Ramanathan et al. ....... | 709/221 |
| 2003/0223431 | A1 * | 12/2003 | Chavez et al. ........... | 370/395.42 |
| 2004/0081104 | A1 * | 4/2004 | Pan et al. ..................... | 370/254 |
| 2004/0083287 | A1 * | 4/2004 | Gao et al. ..................... | 709/226 |
| 2004/0156313 | A1 * | 8/2004 | Hofmeister et al. ......... | 370/229 |
| 2005/0078688 | A1 * | 4/2005 | Sharma et al. ............... | 370/401 |
| 2005/0117512 | A1 * | 6/2005 | Vasseur et al. ............... | 370/229 |
| 2006/0045132 | A1 * | 3/2006 | Metke ........................... | 370/477 |

OTHER PUBLICATIONS

Perlman, Radia, Interconnections Second Edition: Bridges, Routers, Switches, and Internetworking Protocols, Addison Wesley, 1999, Sections 1.1, pp. 1-7.

(Continued)

*Primary Examiner* — Chi H Pham
*Assistant Examiner* — Mohammad S Adhami
(74) *Attorney, Agent, or Firm* — Cesari and McKenna, LLP

(57) ABSTRACT

A technique is provided for one or more network nodes to deterministically select data flows to preempt. In particular, each node employs a set of predefined rules which instructs the node as to which existing data flow should be preempted in order to admit a new high-priority data flow. The rules are precisely defined and are common to all nodes configured in accordance with the present invention. Illustratively, a network node not only selects a data flow to preempt, but additionally may identify other "fate sharing" data flows that may be preempted. As used herein, a group of data flows has a fate-sharing relationship if the application instance(s) containing the data flows functions adequately only when all the fate-shared flows are operational. In a first illustrative embodiment, after a data flow in a fate-sharing group is preempted, network nodes may safely tear down the group's remaining data flows. In a second illustrative embodiment, when a data flow is preempted, all its fate-shared data flows are marked as being "at risk." Because the at-risk flows are not immediately torn down, it is less likely that resources allocated for the at-risk flows may be freed then subsequently used to establish relatively lower-priority data flows instead of relatively higher-priority data flows.

25 Claims, 14 Drawing Sheets

OTHER PUBLICATIONS

Braden, R. et al., Network Working Group RFC 2205, entitled Resource ReSerVation Protocol (RSVP)—Version 1 Functional Specification, Sep. 1997, pp. 1-105.

Herzog, S., Network Working Group RFC 3181, entitled Signaled Preemption Priority Policy Element, Oct. 2001, pp. 1-12.

Braden, R. et al., Network Working Group RFC 2209, entitled Resource ReSerVation Protocol (RSVP)—Version 1 Message Processing Rules, Sep. 1997, pp. 1-24.

Herzog, S., Network Working Group RFC 2750, entitled RSVP Extensions for Policy Control, Jan. 2000, pp. 1-13.

* cited by examiner

MECHANISM TO IMPROVE PREEMPTION BEHAVIOR OF RESOURCE RESERVATIONS

FIELD OF THE INVENTION

This invention relates generally to network communications, and, more specifically, to a technique that enables network nodes to efficiently preempt relatively lower-priority data flows in favor of relatively higher-priority data flows.

BACKGROUND INFORMATION

A computer network is a geographically distributed collection of interconnected subnetworks for transporting data between network nodes, such as computers. A local area network (LAN) is an example of such a subnetwork. The network's topology is defined by an arrangement of client nodes that communicate with one another, typically through one or more intermediate network nodes, such as routers or switches. As used herein, a client node is a network node that is configured to originate or terminate communications over the network. In contrast, an intermediate network node is a node that facilitates routing data between client nodes. Communications between network nodes are typically effected by exchanging discrete packets of data according to predefined protocols. In this context, a protocol consists of a set of rules defining how the nodes interact with each other.

The data packets transferred among the network nodes may include fixed-sized data cells and/or variable-sized data frames. Each data packet typically comprises "payload" data prepended ("encapsulated") by at least one network header formatted in accordance with a network communication protocol. The network headers include information that enables the client nodes and intermediate nodes to route the packet efficiently through the computer network. Often, a packet's network headers include at least a data-link (layer 2) header and an internetwork (layer 3) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

In operation, a client node may send a data packet to a network interface of an intermediate network node. Thereafter, the intermediate network node receives the packet and forwards the packet to its next destination. For example, the intermediate network node may perform a layer-2 switching function that simply re-directs the packet from one network interface to another based on the contents of the packet's data-link header. Alternatively, the intermediate network node may perform a layer-3 routing function, or forwarding decision, that selects the most appropriate network interface to forward the packet based on the contents of the packet's internetwork header.

Data packets are used to transport many forms of information, including voice and video information, over networks and subnetworks. For instance, voice information may be transmitted in accordance with the Voice over Internet Protocol (VoIP). VoIP refers to a group of technologies used to transmit voice information over data networks from a source node to a destination node. The source and destination nodes employ voice agents that convert voice information from its traditional telephony form to a form that is suitable for packet transmission. In other words, the source node's voice agent encodes, compresses and encapsulates the voice information into a plurality of data packets, and the destination node's voice agent performs complementary functions to decapsulate, uncompress and decode the VoIP packets. Examples of voice agents include IP telephones, VoIP gateways, certain private branch exchanges (PBXs), personal computers (PCs) running communication applications, network devices providing voice gateway services, etc.

Similarly, video information may be carried by various technologies that include video conferencing. Here, data may be processed in much the same fashion as VoIP systems such that a video agent at a source node encodes, compresses and encapsulates voice and video information into packets and transfers the packets over a data network to a video agent at a destination node. The destination node's video agent may decapsulate, uncompress and decode the voice and video information and present it accordingly.

A source node (sender) may be configured to transfer a unidirectional stream of data packets, or a "data flow," to a destination node (receiver) in a data network. The data flow may comprise, for example, voice or video information. The data flow is unidirectional in that data travels one-way from the sender to the receiver. The logical procession of network nodes that transmit and receive data packets from the sender to the receiver defines the data flow's data path. A first node that is nearer the receiver in the data flow's data path than a second node in the path is said to be "downstream" from the second node. Likewise, a first node that is nearer the sender in the data flow's path than a second node in the path is said to be "upstream" from the second node.

As used herein, an "application instance" is broadly defined as a set of one or more related data flows. More specifically, the data flows in the application instance are related such that loss or corruption of any one of the flows affects the utility of the other flows. For example, an application instance may comprise two opposing data flows that transport voice information in a telephone call. In other words, a first data flow may transport one caller's voice from node A to node B, and a second (opposing) data flow may carry the voice data of the other participant from node B to node A. In this case, loss of either of the data flows may render the telephone call useless.

It should be noted that application data flows need not be symmetrical, as described above in terms of a conventional telephone call. For example, an application instance may have one or two data sources and many receivers, the route from node A to node B may materially differ from the route from node B to node A, or network nodes participating in the same application instance may use different software applications, such as having only a few nodes send video data flows but all send audio, shared whiteboard data or text.

Some data flows are associated with a certain level of quality of service (QoS). For example, a data flow's QoS may specify minimum end-to-end latency or bandwidth requirements needed to support the flow. The Resource reSerVation Protocol (RSVP) is a network-control protocol that enables source and destination nodes to "reserve" the necessary resources to establish the data flow in accordance with the flow's required QoS. RSVP works in conjunction with routing protocols to, e.g., reserve resources along a data path between the source and destination nodes to establish a level of QoS required by the data flow. RSVP is defined in R. Braden, et al., "Resource ReSerVation Protocol (RSVP)," Request For Comments (RFC) 2205, which is hereby incorporated by reference as though fully set forth herein.

In a typical arrangement, the source node sends a RSVP Path message identifying itself and indicating the minimum bandwidth needed to receive the data flow. The Path message proceeds hop-by-hop through the data path, making each intermediate network node aware that a reservation of resources later may be requested. The destination node receives the RSVP Path message and responds with a "request for resources" in the form of a RSVP reservation request (Resv message) which travels hop-by-hop back to the source node. At each hop, the corresponding intermediate network node sets aside sufficient resources to provide the requested bandwidth for the desired data flow. These resources are consequently made available to the data flow so that the data packets of the flow get appropriate QoS treatment.

If sufficient resources are not available, an intermediate network node may "reject" the Resv message (i.e., does not continue forwarding it), generate a reserve error (ResvErr) message and forward the ResvErr message downstream over the path to the destination node. The destination node eventually receives the ResvErr message and concludes that the reservation has failed. A destination node whose Resv message has been rejected may later re-attempt to acquire the resources by re-transmitting another Resv message. Source nodes are unaffected by this process, and they continue to send Path messages to refresh their state.

As defined in RFC 2205, a RSVP data flow is "admitted" and resources allocated to the data flow using a capacity-based admission control technique. According to this technique, resources are allocated to data flows on a "first-come-first-admitted" basis until the capacity of the resources is exhausted. S. Herzog, "RSVP Extensions for Policy Control," RFC 2750, which is hereby incorporated by reference as though fully set forth herein, defines an extension to RFC 2205 that incorporates policy-based admission control. Through this extension to RSVP, admission control involves reserving resources on a policy basis in addition to using capacity as a basis. A simple example of such is an authentication/authorization policy. If a person attempts to reserve bandwidth but is unknown to the administration or makes an unauthorized request, the request will be denied based on the authentication/authorization policy even though bandwidth is available. But among authorized requesters, bandwidth is granted on a first-come-first-admitted basis.

A policy often employed in conjunction with RFC 2750 is a preemption-priority-based policy described in S. Herzog, "Signaled Preemption Priority Policy Element," RFC 3181, which is hereby incorporated by reference as though fully set forth herein. The preemption-priority-based policy incorporates a technique that allows a new reservation to preempt one or more existing lower priority reservations in order to acquire resources reserved for the lower priority reservations. According to the technique, a preemption-priority value is associated with a new reservation and defending-priority values are associated with respective existing reservations. The reservations' preemption and defending priority values may be assigned in various ways known in the art. The preemption-priority value for the new reservation is compared with the defending-priority values of existing reservations to determine if the new reservation "preempts" any existing lower priority reservations. If so, resources allocated to selected lower priority reservations are reallocated for the new reservation.

In practice, a Resv message either contains the preemption-priority value associated with the new reservation or a default preemption-priority value is assigned to the reservation request if it does not already contain one. A network node that receives the Resv message may first determine if sufficient unallocated resources are immediately available to satisfy the resources requested in the Resv message. If not, the node then may identify lower priority existing reservations that may be preempted to meet the needs of the new reservation. This may be done by comparing the new reservation's preemption priority value with the defending priority value of an existing reservation to determine if the new reservation is higher in priority than the existing reservation. If so, the network node may preempt the existing reservation by "tearing it down" and reallocating the resources associated with the torn down reservation to the new reservation. Thereafter, a ResvErr message is sent downstream along the data path to notify the downstream nodes, including the destination node, of the preemption.

In conventional implementations, when there are multiple low-priority reservations that are eligible to be preempted, i.e., having defending-priority values less than the new reservation's preemption-priority value, any one of the low-priority reservations may be selected and preempted. Then, the state corresponding to the selected reservation is torn down and its resources reallocated for the new reservation's data flow. Accordingly, an application instance (if one exists) containing the torn-down data flow may be negatively affected, or "disrupted," as a result of the preemption. That is, the utility of the remaining data flows in the application instance may be significantly diminished unless the torn-down data flow is re-established. Note that in prior-art implementations these "low utility" flows are not themselves preempted and are no more likely to be preempted in the future than any other flow of the same defending-priority value.

When it is required that two or more reservations are preempted, it is desirable to minimize the number of application instances that are disrupted. Thus, for example, if it is necessary to preempt one reservation in each direction over a single communications link, it would be best to preempt two reservations that correspond to the same application instance (e.g., the same telephone call). However, because conventional preemption techniques do not intelligently select which reservations to preempt, it is not likely that two randomly-selected reservations will correspond to the same application instance.

As a simple example, consider two network nodes A and B at opposite ends of a communications link. Assume the link is carrying its full capacity of reservations, and that each reservation corresponds to one direction of a bi-directional voice call. Further, assume all calls have identical bandwidth needs, and that there are two preemption priorities: high and low. When a new high-priority call begins, a Resv message arrives at node A to reserve resources for the new call. In response, the node A selects an existing low-priority call to preempt and reallocates the preempted call's resources, such as bandwidth and memory usage, for the new, high-priority call.

Soon afterwards, a Resv message for the other direction of the high-priority call arrives at node B. Accordingly, the node B also needs to preempt a reservation. Even though node B may now know which reservation was preempted by node A, it needs to preempt a reservation in the other direction, and there is no easy way for node B to determine which, among all the reservations previously installed, is the "partner" reservation to the one just preempted by node A. Thus, the node B selects a reservation to preempt, with significant likelihood of disrupting another call unrelated to the one disrupted by the node A.

In circuit or virtual circuit networks, this problem would typically be dealt with by treating each call (i.e., application instance) as a separate bi-directional virtual circuit having forward and return data paths. As such, when a call is preempted, the call's virtual circuit is torn down, thereby freeing resources in two directions. While this solution effectively reallocates resources for application instances consisting of two opposing data flows, such a solution does not address more complex application instances, e.g., having more than two constituent data flows or having data flows in the same direction. Furthermore, no mechanism currently exists for connectionless (datagram) networks to determine reliably whether two or more selected low-priority reservations correspond to data flows in the same application instance.

SUMMARY OF THE INVENTION

The present invention overcomes the disadvantages of the prior art by providing a technique for one or more network nodes to deterministically select data flows to preempt. In particular, each node employs a set of predefined rules which instructs the node as to which existing data flow should be preempted in order to admit a new high-priority data flow. The rules are precisely defined and are common to all nodes configured in accordance with the present invention. As such, a set of network nodes situated along a data path make consistent choices regarding which data flows to preempt. For example, the predefined rules may instruct the nodes to preempt the most-recently established data flow or the least-recently established flow. By selecting data flows to preempt in a predictable manner, the nodes are more likely to preempt flows participating in the same application instance than prior implementations. Accordingly, fewer application instances are disrupted as a result of the preemptions.

In accordance with the illustrative embodiments, a network node not only selects a data flow to preempt, but additionally may consider other "fate shared" data flows that may be preempted. As used herein, a group of data flows has a fate-sharing relationship if the application instance(s) containing the data flows functions adequately only when all the fate-shared flows are operational. In other words, if any of the fate-shared data flows is preempted and thus terminated ("torn down"), all other fate-sharing flows in the group consequently lose their utility. In this case, the network nodes may safely terminate the remaining fate-shared data flows in the group without unnecessarily disrupting application instances that remain operational.

Preferably, each group of fate-shared data flows is associated with a unique identifier, such as a universal unique identifier (UUID). The UUID is preferably unique in both space and time. For instance, the UUID may be derived from a combination of a media access control (MAC) address and a timestamp associated with at least one of the data flows in the fate-sharing group. The UUID may be stored in a "fate-sharing object" (FSO) which is distributed to each of the network nodes that transmit and/or receive data flows in the group of fate-sharing flows. The FSO may be disseminated among the client nodes using a conventional end-to-end signaling protocol, such as the Session Initiation Protocol (SIP) or H.323 protocol, or by other appropriate means (e.g. from a central server). The FSO is included in resource reservation messages that are sent from the client nodes into the network.

In accordance with an illustrative embodiment, when a data flow in a fate-sharing group is preempted at a network node, the node tears down all its existing data flows in the fate-sharing group. Then, the network node may communicate the FSO of the preempted data flow to the node's neighboring nodes, e.g., using a signaling protocol such as RSVP. In response, the neighboring nodes may safely tear down all their existing data flows associated with the received FSO. The neighboring nodes may forward the FSO to their neighbors that, in turn, tear down data flows in the fate-sharing group, and so on. In this way, each node "frees" network resources, such as bandwidth and memory usage, previously used to support the fate-sharing flows even before new requests for the resources arrive.

In an alternative illustrative embodiment, when a data flow is preempted at a network node, that node may disseminate the FSO (if one exists) of the preempted data flow and mark all other data flows associated with the FSO as being "at risk." Similarly, other interconnected network nodes that receive the FSO may mark existing data flows in the fate-sharing group as being at risk. Because the at-risk data flows are not immediately torn down, network resources reserved for the at-risk flows are not freed until the at-risk flows are later preempted or otherwise terminated. As such, it is less likely that resources allocated for the at-risk flows may be freed then subsequently used to establish relatively lower-priority data flows instead of relatively higher-priority data flows.

For instance, suppose a high-priority data flow is to be established at a network node that lacks available resources to establish the new data flow. In accordance with the illustrative embodiment, the node selects an appropriate at-risk data flow to preempt in order to free resources for the high-priority data flow. To that end, the node may implement a data-flow selection policy that selects an at-risk data flow based on, for example, the fate-sharing identifier and preemption-priority value of the data flow that placed the selected at-risk data flow at risk. Once the selected at-risk data flow is preempted, the freed resources are then immediately allocated to the high-priority data flow rather than to a different, e.g., lower-priority, data flow.

Advantageously, the inventive technique may be used to preempt data flows efficiently in both client nodes and/or intermediate network nodes with minimal disruptions of existing application instances. Further, the data flows in the present invention may originate from and/or terminate on the same or different network nodes in a network. The inventive technique may be used to preempt resource reservations efficiently in accordance with a resource reservation protocol, such as the Resource ReSerVation Protocol (RSVP).

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF ILLUSTRATIVE EMBODIMENTS

Figure 1:
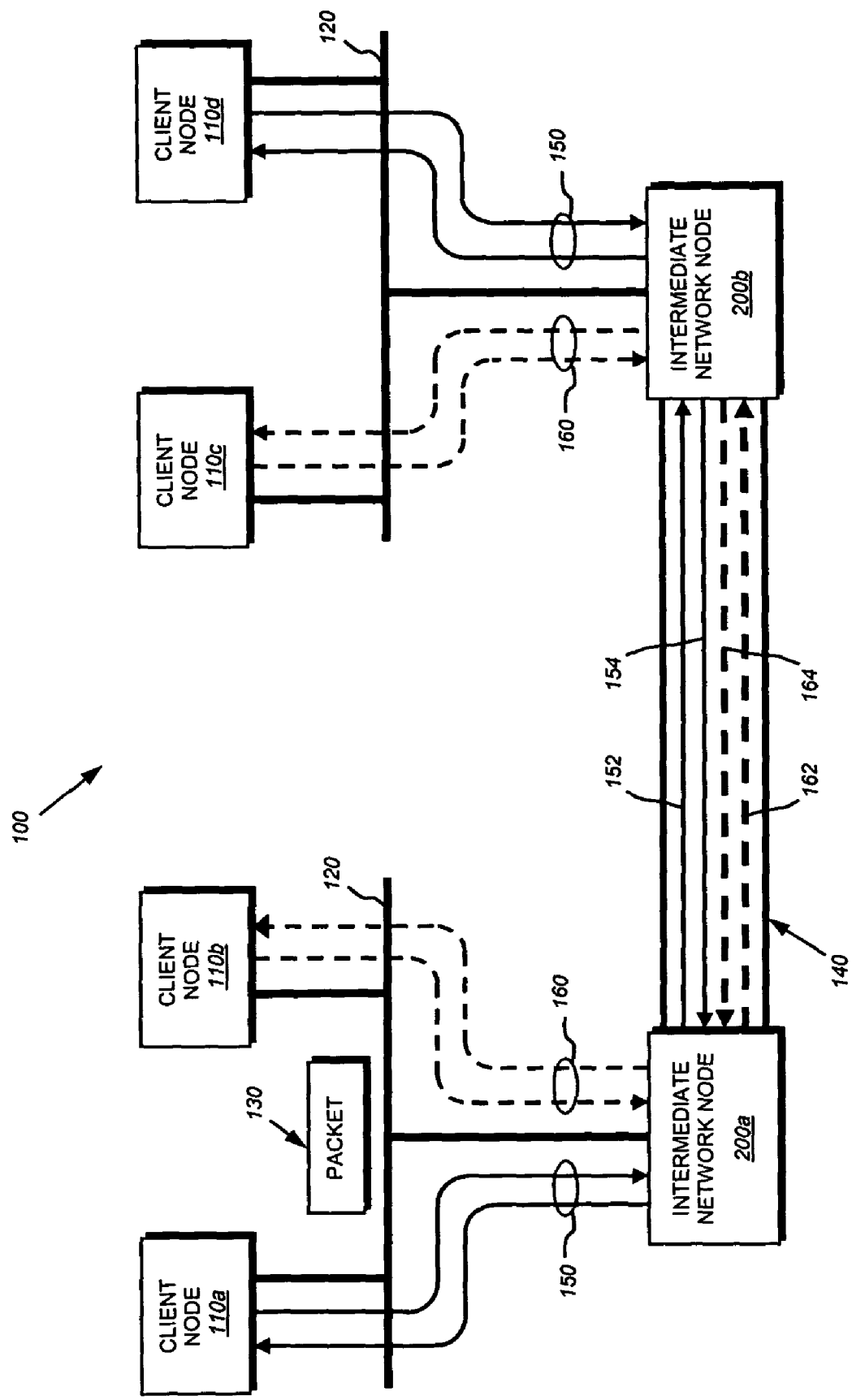
FIG. 1 is a schematic block diagram of an exemplary computer network in which a plurality of data flows may be established in accordance with the present invention.

FIG. 1 is a schematic block diagram of a network 100 that advantageously may be used with the present invention. The network comprises a plurality of interconnected network nodes, such as client nodes 110 and intermediate network nodes 200. The nodes may be coupled to one another over local area networks (LAN) 120, point-to-point links 140, wide area networks (WAN), wireless LANs, etc. to form the network 100. The interconnected network nodes may exchange discreet data packets 130 which are formatted according to predefined sets of network communication protocols, such as the Transmission Control Protocol/Internet Protocol (TCP/IP) and the Resource Reservation Protocol (RSVP).

A unidirectional stream of data packets 130, or a "data flow," may be transmitted from a source client node to a destination client node. The data flow may traverse one or more intermediate network nodes 200, such as routers or switches, positioned along the data path interconnecting the source and destination nodes. For example, a first data flow 152 may be established between a source node 110a and a destination node 110d. Likewise, a second data flow 154 may be established in the opposite direction, i.e., originating at the node 110d and terminating at the client node 110a.

An application instance is broadly defined as a set of one or more related data flows. More specifically, the data flows are related such that loss or corruption of any one of the flows affects the utility of the other flows in the application instance. For instance, suppose the first and second data flows 152 and 154 transport voice information in a bi-directional telephone call. In this case, the telephone call may be considered an application instance 150 containing the two data flows 152 and 154. Similarly, the application instance 160 may correspond to a different bi-directional call containing the data flows 162 and 164, e.g., transmitted between the client nodes 110b and 110c.

As shown, the data paths for each of the data flows 152, 154, 162 and 164 traverse the point-to-point link 140 between the intermediate network nodes 200a and 200b. Typically, this link is associated with a finite amount of network resources to support network traffic. For instance, the network resources may include, inter alia, a limited amount of network bandwidth, buffer memory, ingress and egress queue lengths, etc. Therefore, it is not uncommon for the resources associated with a communication link, such as the point-to-point link 140, to become exhausted due to heavy amounts of network traffic. As such, the link essentially becomes "saturated" and cannot support any additional data flows. Such a situation may arise, for example, in response to an emergency event where a large number of people attempt to communicate over the communication link at substantially the same time.

Figure 2:
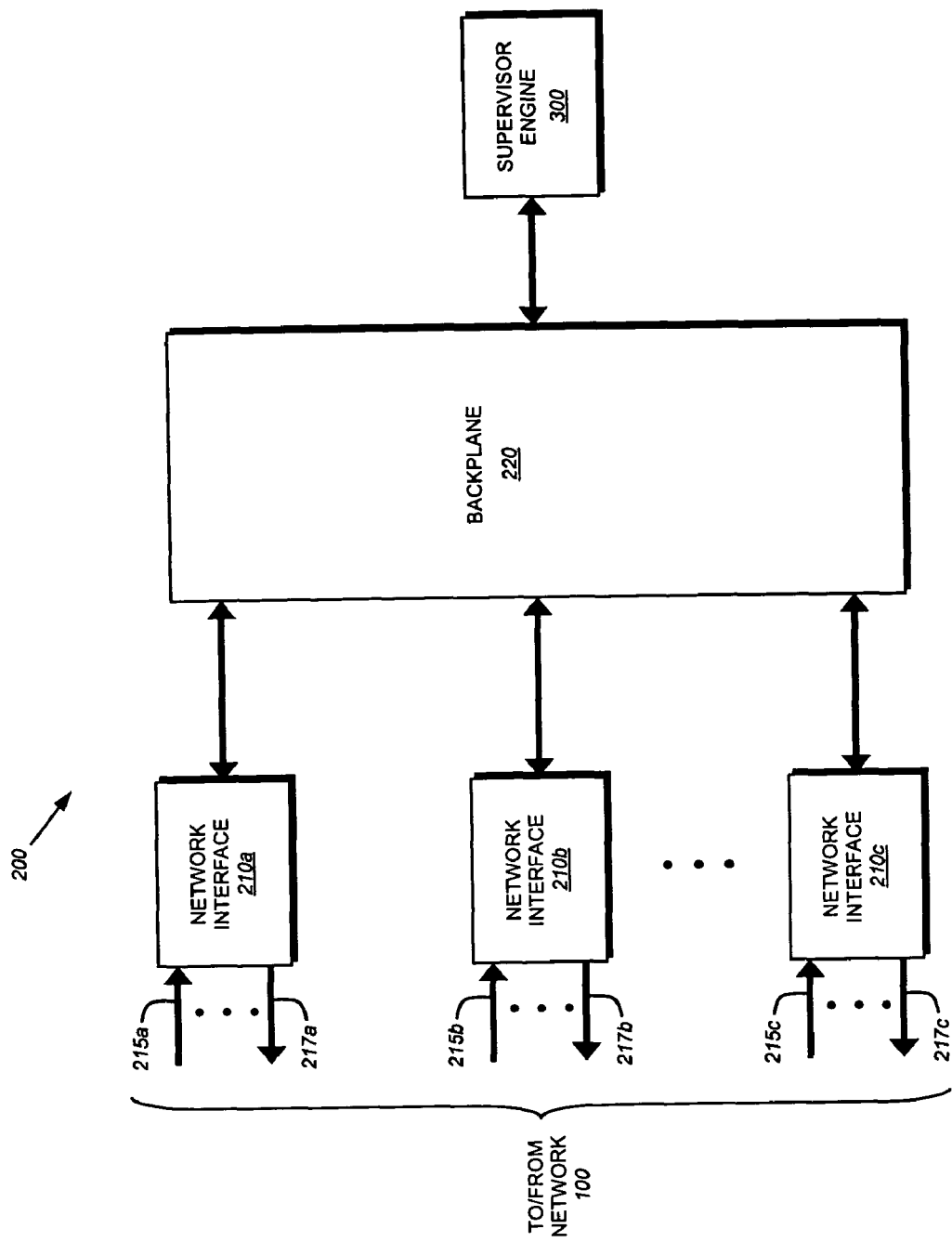
FIG. 2 is a schematic block diagram of an intermediate network node that may be advantageously used in the computer network in FIG. 1.

FIG. 2 is a schematic block diagram of an intermediate network node 200, which is illustratively a router, that may be advantageously used with the present invention. Suitable intermediate nodes that may be used with the present invention include the Cisco 7200 Series Routers and the Cisco 7600 Series Routers available from Cisco Systems Incorporated, San Jose, Calif. The intermediate network node 200 comprises one or more network interfaces 210 and a supervisor engine card 300 interconnected by a backplane 220. The node 200 is configured to perform, inter alia, various layer-2 (data-link layer) and layer-3 (internetwork layer) switching and routing functions including forwarding and processing data packets in accordance with the inventive technique. The intermediate network node 200 also may be configured to support various combinations of conventional routing and switching protocols known in the art.

The backplane 220 comprises a point-to-point interconnect fabric that interconnects the various network interfaces 210 and allows data and signals to be transferred from one network interface to another. The interfaces 210 connect the intermediate node 200 with the network 100. To that end, the network interfaces transfer and acquire data packets 130 to and from the network via output ports 217 and input ports 215, respectively, using various protocols such as, e.g., Asynchronous Transfer Mode (ATM), Ethernet, and multi-channel T3. Functionally, the network interfaces 210 acquire data packets 130 from the network 100 via the input ports 215 and forward the data packets to the backplane 220, as well as transfer data packets acquired from the backplane 220 to the network 100 via the output ports 217. The ports 215, 217 may comprise, e.g., ATM, Ethernet, Fast Ethernet (FE), Gigabit Ethernet (GE), and frame relay (FR) ports.

The supervisor engine 300 comprises circuitry and logic configured to manage the switching and routing operations performed by the intermediate network node 200. To that end, the supervisor engine may include a processor configured to execute a router operating system, such as the IOS™ operating system by Cisco Systems Incorporated. Further, the supervisor engine may execute various network protocols, such as the Resource Reservation Protocol (RSVP), and perform other functions including, e.g., processing RSVP messages in accordance with inventive technique.

Figure 3:
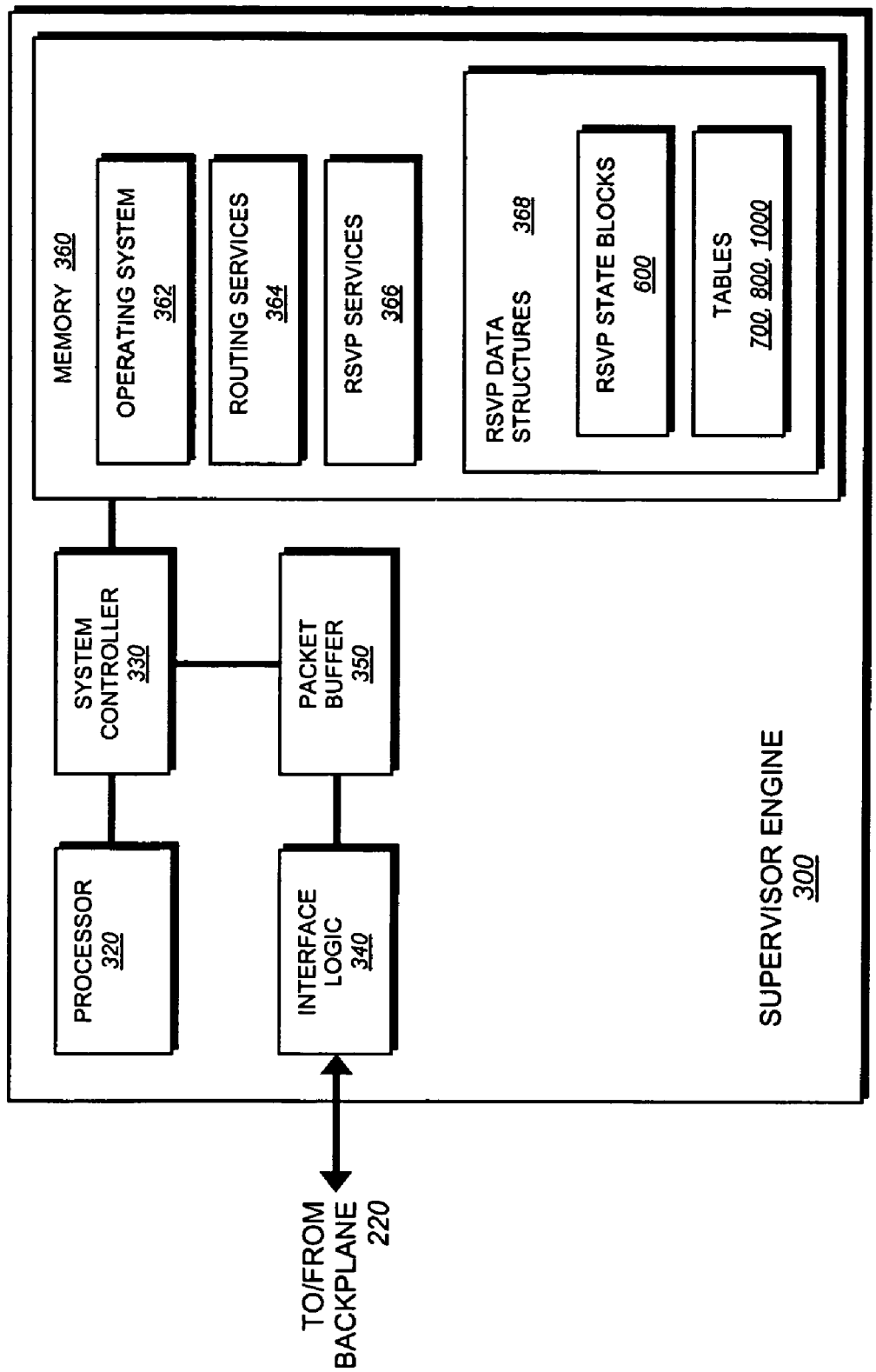
FIG. 3 is a schematic block diagram of a supervisor engine that may be employed by the intermediate network node in FIG. 2.

FIG. 3 illustrates the supervisor engine 300 in more detail. The supervisor engine comprises a processor 320, a system controller 330, interface logic 340, a packet buffer 350 and a memory 360. The processor 320 is a general-purpose or special-purpose central processing unit (CPU) configured to execute computer-readable instructions stored in the memory 360. The system controller 330 is coupled to the processor 320, memory 360 and packet buffer 350. The system controller comprises logic and circuitry that enables the processor 320 to access (e.g., read, write) memory locations contained in the packet buffer 350 and the memory 360. The interface logic 340 is coupled to the backplane 220 and is configured to transfer data between the backplane and the supervisor engine 300. The packet buffer 350 is a conventional packet memory comprising random access memory (RAM) devices capable of storing data packets 130 acquired by the interface logic 340 and processed by the processor 320.

The memory 360 preferably comprises a form of RAM that is generally cleared by a power cycle or other reboot operation (e.g., it is a "volatile" memory). For instance, the memory may comprise dynamic RAM (DRAM) and/or synchronous DRAM (SDRAM) storage locations adapted to store program code and data structures accessible to the processor 320 via the system controller 330. It will be apparent to those skilled in the art that the memory 360 also may comprise other memory means, including various computer-readable media, for storing program instructions and data structures pertaining to the operation of the intermediate network node 200. Further, those skilled in the art will appreciate that at least some portions of the memory 360 may be embodied as electromagnetic signals that are transmitted from a remote memory element to the supervisor engine 300.

The memory 360 stores, among other things, instructions for implementing an operating system 362, routing services 364 and RSVP services 366. The operating system 362 comprises computer-executable instructions that functionally organize the intermediate network node 200 by, e.g., invoking network operations in support of software processes and services executing on the processor 320. These services and processes may include the RSVP services 366 which can be used to implement various aspects of the illustrative embodiments described herein.

The routing services 364 include computer-executable instructions which may be executed by the processor 320 for performing various routing protocols, such as the Open Shortest Path First (OSPF) and Intermediate-System-to-Intermediate-System (IS-IS) protocols. The routing services 364 may be configured to manage a routing information database (not shown) containing, e.g., information used to make forwarding decisions for received data packets 130. In some embodiments, the routing information database, or portions thereof, may be distributed to the various network interfaces 210 for processing packets directly at the interfaces.

The RSVP services 366 include computer-executable instructions for, inter alia, implementing the RSVP protocol and processing RSVP messages in accordance with the inventive technique. As noted, the RSVP protocol is described RFC 2205 which is hereby incorporated by reference as though fully set forth herein. The RSVP services 366 may further contain computer-executable instructions for implementing extensions to the RSVP protocol, such as implementing a preemption-priority based policy, as described in RFC 2750 and RFC 3181, both of which also have been incorporated by reference as though fully set forth herein.

The memory 360 stores one or more RSVP data structures 368 which are accessible to the RSVP services 366. The RSVP data structures 368 may include, among other things, reservation state blocks 600 for storing state information associated with data flows. In general, the state blocks 600 store meta-data necessary for establishing and/or sustaining data flows processed at the intermediate network node 200. The RSVP data structures 368 also may include various searchable data structures, such as the tables 700, 800 and 1000, that logically organize the reservation state blocks 600.

Figure 4:
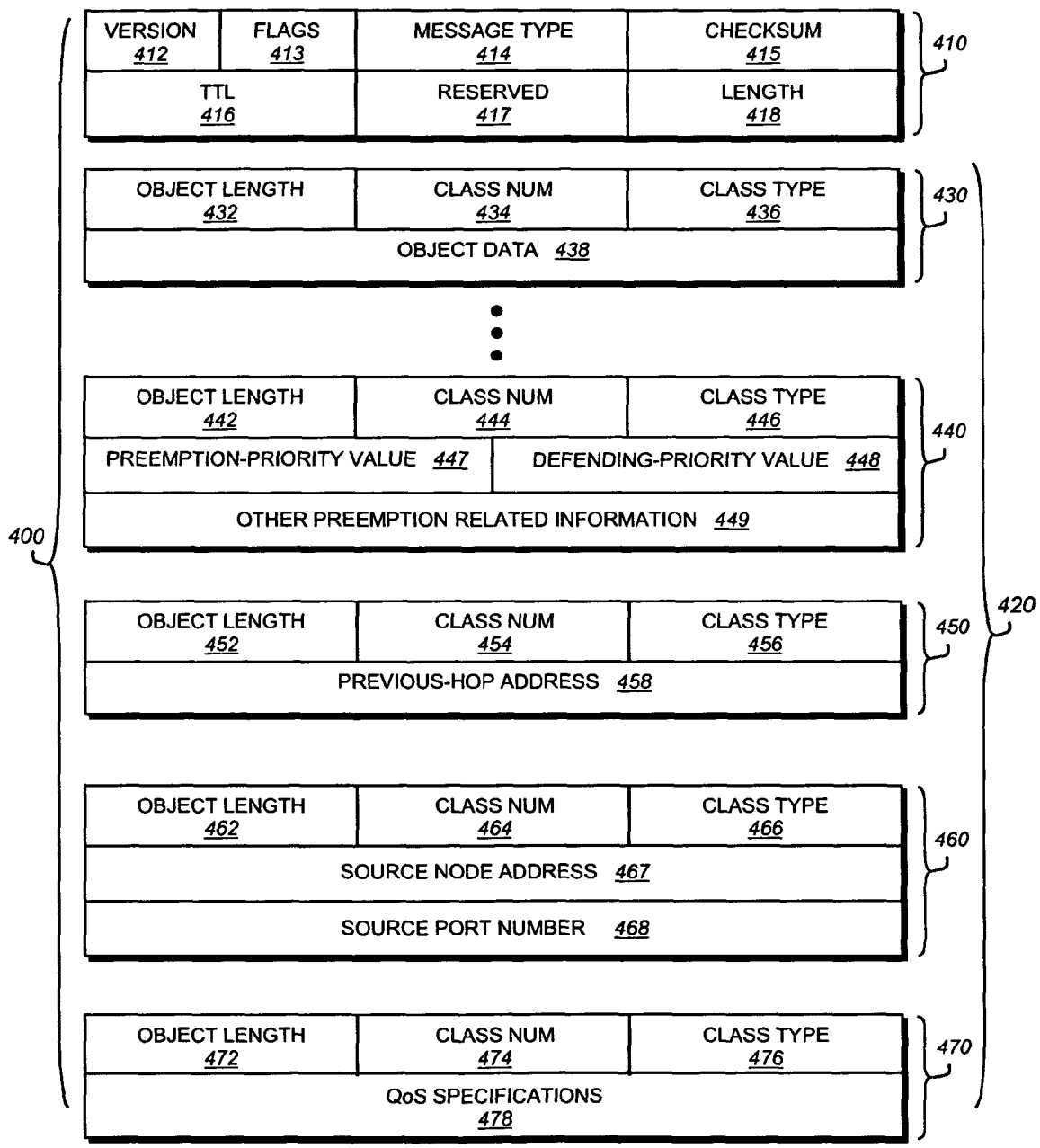
FIG. 4 is a schematic block diagram of an exemplary RSVP packet.

FIG. 4 is a schematic block diagram of an exemplary RSVP message 400 that may be used in accordance with the present invention. The RSVP message 400 contains a header 410 and a data section 420. The header 410 stores information about the RSVP message 400. In particular, the RSVP header 410 comprises a version field 412, a flags field 413, a message-type field 414, a checksum field 415, a "time-to-live" (TTL) field 416, a reserved field 417 and a length field 418. The version field 412 stores a version number which identifies the version of the RSVP protocol associated with the message. The flags field 413 is configured to store one or more flag values associated with the message 400. The message-type field 414 stores an identifier that identifies the type of RSVP message. For example, the value stored in the field 414 may correspond to a RSVP path (Path) message, reservation request (Resv) message, reservation error (ResvErr) message or path error (PathErr) message. The checksum field 415 stores a value that represents a checksum (or other data integrity check) for the message 400.

The TTL field 416 stores a value that may be used to detect non-RSVP nodes along a data path. Specifically, RSVP-configured network nodes "age" both the TTL values stored in the field 416 and in an IP header prepended to the RSVP message 400; non-RSVP nodes adjust only the TTL value stored in the IP header. Accordingly, if the values of the IP and RSVP TTL values differ, then it can be concluded that the message 400 has been processed by a non-RSVP configured node. The length field 418 stores a value corresponding to the length, preferably in bytes, of the RSVP message 400. The reserved field 417 is currently not used for conventional RSVP messaging.

The RSVP data section 420 includes, inter alia, one or more RSVP objects 430, such as a preemption object 440, a hop object 450, a sender-template object 460 and a flow-specification object 470. Those skilled in the art will understand that various RSVP objects may be added, removed or substituted to the data section 420 without affecting the inventive technique. Further, the exemplary objects 440-470 may be elements of other objects 430. For instance, the preemption object 440 may be a preemption-priority element of a policy-data object, as described in RFC 3181. Notably, different types of RSVP messages, such as RSVP Path and Resv messages, may contain different combinations of RSVP objects 430.

Each object 430 in the RSVP data section 420 contains an object header comprising an object-length field 432, a class-number field 434, and a class-type field 436 which precede the object's data portion 438. The object-length field 432 stores a value representing the length of the object 430. The class-number field 434 stores a value that identifies which type, or "class," of object data is stored in the data portion 438. The class number may correspond to a particular type of conventional RSVP object, such as a hop object, sender-template object, etc., or alternatively may correspond to a fate-sharing object 500 described in more detail below. The class-type field 436 stores a value that further characterizes the type of object identified in the class-number field 434. For instance, the value stored in the field 436 may specify whether, e.g., the object is configured in accordance with IP Version 4 (IPv4) or IP Version 6 (IPv6). The remaining contents of the object 430 are stored in one or more fields of the object data portion 438.

By way of example, consider the RSVP objects 440-470. The preemption object 440 contains the standard object-header fields 442, 444 and 446 followed by object data fields configured to store a preemption-priority value 447, a defending-priority value 448 and other preemption-related information 449. The defending-priority value 448 indicates the relative ease with which a data flow may be preempted. Illustratively, a relatively small defending-priority value may indicate that the data flow is a low-priority flow and thus easily preempted by higher-priority data flows. In contrast, the preemption-priority value 447 indicates the relative ease with which a new data flow may preempt existing data flows. In practice, if the amount of available network resources is insufficient to establish a new data flow, the preemption-priority value 447 associated with the new flow may be compared with defending-priority values of existing data flows to determine whether any existing flow(s) may be preempted.

The preemption-related information 449 may store other data which is useful when preempting existing data flows. Such information may include merge-strategy information, various flags, error codes and other information known in the art.

The hop object 450 includes the object-header fields 452, 454 and 456 followed by a field containing a previous-hop address 458. The previous-hop address may correspond to, e.g., the IP address of the last network node which transmitted the RSVP message 400. For example, in the case of a Path message traveling downstream along a data path, the previous-hop address 458 corresponds to the network address of an adjacent upstream network node in the data path. The address 458 alternatively may identify the next logical downstream node along the data path. For instance, because RSVP Resv messages travel in an upstream direction, the previous-hop address 458 in a Resv message corresponds to an adjacent downstream node.

The sender-template object 460 contains the object-header fields 462, 464 and 466, as well as object data fields for storing a source-node address 467 and source-node port number 468. The source-node address identifies a network node which is the source of the data flow whose network resources are being reserved by the message 400. The source-node port number corresponds to a specific software application executing at the source node. The application identified by the source-port number 468 is typically the application that generates the data flow. Similarly, there may be a RSVP session object (not shown) that specifies the destination-node address and destination-node port number for the data flow.

The flow-specification object 470 includes the object-header fields 472, 474 and 476 as well as object data fields configured to store quality of service (QoS) data 478. The QoS data may include, inter alia, various information defining the resource requirements for establishing and/or maintaining the data flow associated with the RSVP message 400. Accordingly, the QoS data 478 may define various traffic parameters, such as minimum bandwidth and/or latency requirements, associated with the data flow.

Figure 5:
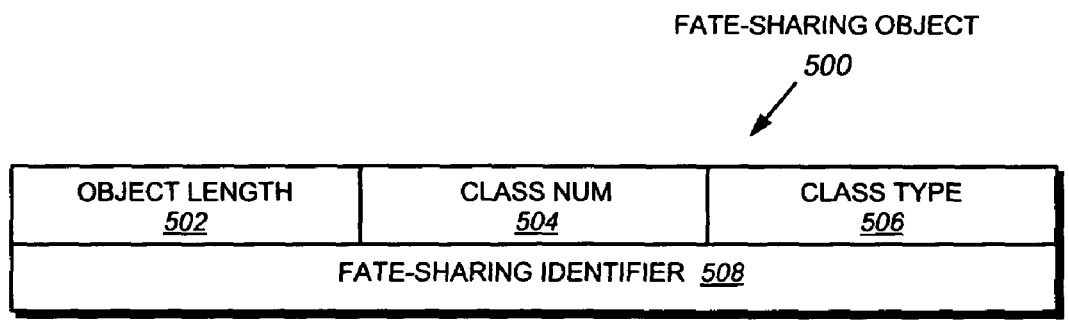
FIG. 5 is a schematic block diagram of an illustrative fate-sharing object that advantageously may be used to store a fate-sharing identifier in the RSVP packet in FIG. 4.

FIG. 5 illustrates a novel fate-sharing object (FSO) 500 that may be used in accordance with the present invention. Like the RSVP objects 430, the FSO 500 comprises an object length field 502, a class-number field 504 and a class-type field 506. The fields 502-506 serve the same function as in conventional RSVP objects 430. However, a new class number and/or class type may be associated with the FSO 500. The FSO 500 contains an object data field for storing a fate-sharing identifier 508. The fate-sharing identifier is a value that identifies a group of data flows having a fate-sharing relationship. As defined herein, a group of data flows has a fate-sharing relationship if the application instance(s) containing the data flows functions correctly only when all the fate-sharing flows are operational. In other words, if any of the fate-sharing data flows is preempted and thus terminated ("torn down"), all other fate-sharing flows in the fate-sharing group are rendered useless. Typically, an application running in a network node or a user of a network node determines if two or more flows have enough in common to warrant fate sharing among them.

In the illustrative embodiments, each group of fate-sharing data flows is associated with a unique fate-sharing identifier 508, such as a universal unique identifier (UUID). The UUID is preferably unique in both space and time. For instance, the UUID may be derived from a combination of a media access control (MAC) address and a timestamp associated with at least one of the data flows in the fate-sharing group. The fate-sharing identifier 508 may be distributed to each of the network nodes which transmits and/or receives data packets in the fate-sharing group. This may be done using end-to-end signaling protocols, such as the Session Initiation Protocol (SIP) or H.323 protocol, or by an appropriate "out-of-band" means, such as telephonic or postal delivery. The identifier 508 may also be disseminated to the internal network nodes through which the data flows pass. This may be achieved by encapsulating the identifier in the FSO 500 and disseminating it in a RSVP message 400.

When a new data flow is to be established, a source node generates a RSVP Path message 400 indicating the QoS requirements for establishing the new flow. The Path message is forwarded to one or more downstream nodes. Upon receiving the Path message, a downstream node subsequently allocates a reservation state block, e.g., in its memory 360, for the new data flow. Thereafter, state information associated with the flow is stored in the allocated state block. Such information may include, for example, the network address and/or port number of the source and destination nodes, QoS specifications for the data flow, preemption-related information for the flow, a fate-sharing identifier associated with the flow, etc. At least some of the state information stored in the reservation state block may be extracted from appropriate fields in the received Path message and from fields in corresponding Resv messages issued in response to the Path message.

Here, it is noted that RFC 2209, entitled *Resource ReSerVation Protocol (RSVP)—Version 1 Message Processing Rules*, published September 1997, and hereby incorporated by reference in its entirety, describes separate state blocks for Path and Resv messages. However, for simplicity, the Path and Reservation state blocks for a given data flow will be illustrated as a single reservation state block. Those skilled in the art will appreciate that the illustrative embodiments described herein alternatively may be implemented using the separate Path and Reservation state blocks described in the RFC 2209 without loss of generality.

Figure 6:
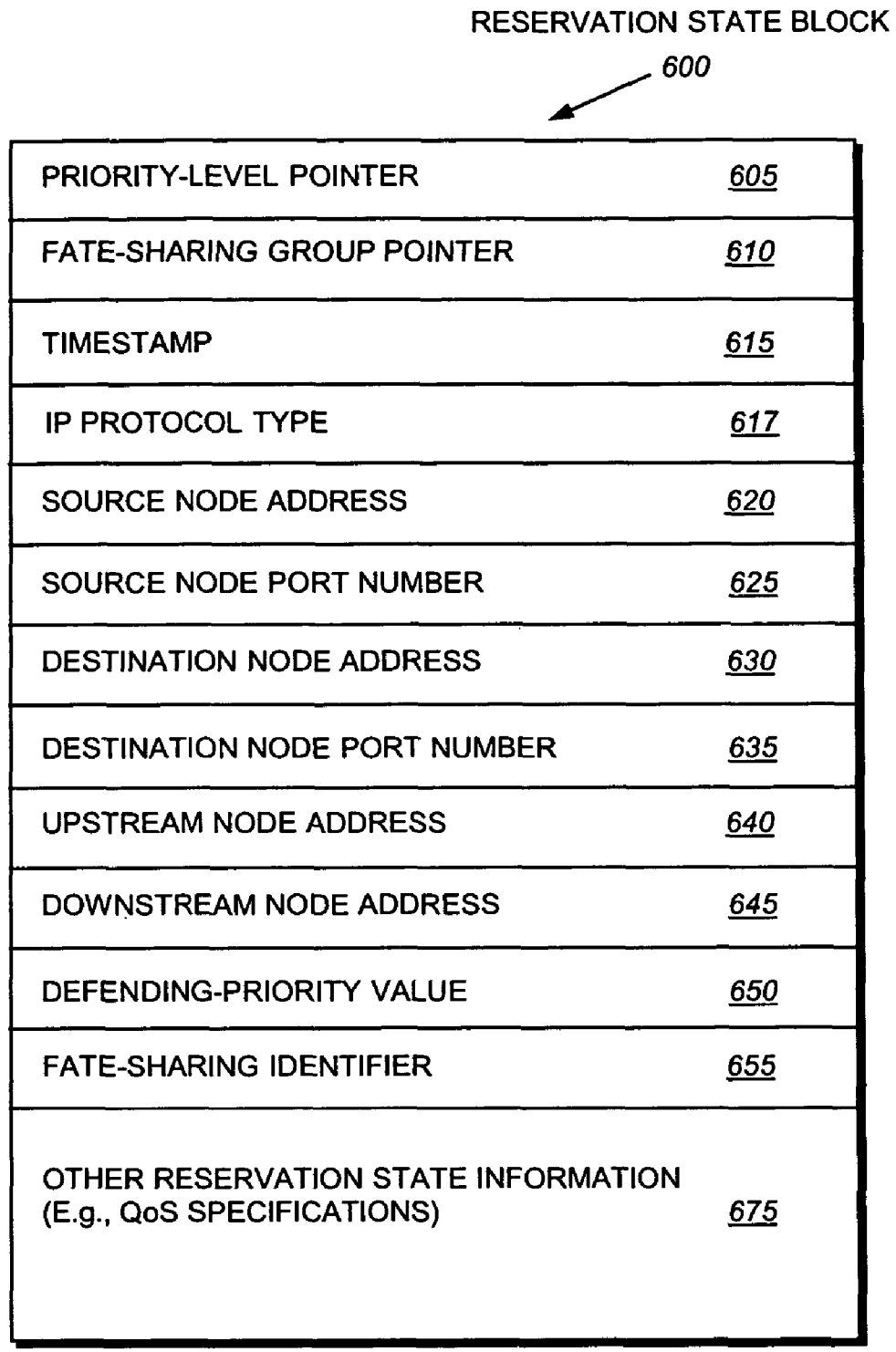
FIG. 6 is a schematic block diagram of an exemplary reservation state block configured to store meta-data associated with a data flow.

FIG. 6 illustrates an exemplary reservation state block 600 that may be allocated in response to receiving a RSVP Path message 400 corresponding to a new data flow. The reservation state block comprises a priority-level pointer 605, a fate-sharing group pointer 610, a timestamp 615, an IP protocol type 617, a source-node address 620, a source-node port number 625, a destination-node address 630, a destination-node port number 635, an upstream-node address 640, a downstream-node address 645, a defending-priority value 650, a fate-sharing identifier 655 and other reservation-state information 675. The contents of the reservation state block 600 are preferably initialized to respective, predetermined values when the state block is allocated.

The priority-level pointer 605 may be used to logically arrange a group of reservation state blocks having the same defending-priority level 650. Similarly, the fate-sharing group pointer 610 may be used to logically arrange a group of reservation state blocks whose associated data flows participate in the same fate-sharing group. The timestamp 615 stores a value indicating a time-related quantity which, in some embodiments, may be used to derive the fate-sharing identifier 508. For example, the timestamp value may store the time at which the reservation state block 600 was allocated. The IP protocol type 617 stores a value indicating the protocol used to transport the data flow, e.g., TCP or the User Datagram Protocol (UDP). The source-node address 620 and source-node port number 625 may be extracted from a sender-template object 460 in a received Path message 400 to identify the source of the reservation state block's associated data flow. Likewise, a destination-node address 630 and destination-node port number 635 may be extracted from a received RSVP message 400 to identify the software application and network node at the logical end of the data flow.

The upstream and downstream node addresses 640 and 645 respectively store the network addresses of adjacent network nodes along the data flow's data path. The addresses 640 and 645 may be determined from the contents of hop objects 450 contained in messages 400 transmitted along the data path. The defending-priority value 650 stores a value indicating the relative ease with which the reservation state block's associated data flow, once established, may be preempted. Preferably, smaller defending-priority values correspond to lower-priority data flows, i.e., that are easier to preempt. The fate-sharing identifier 655 stores a value indicating to which fate-sharing group, if any, the data flow belongs. The other reservation state information 675 stores, for example, QoS specifications and other network-resource requirements needed to sustain the data flow associated with the state block 600.

Figure 7:
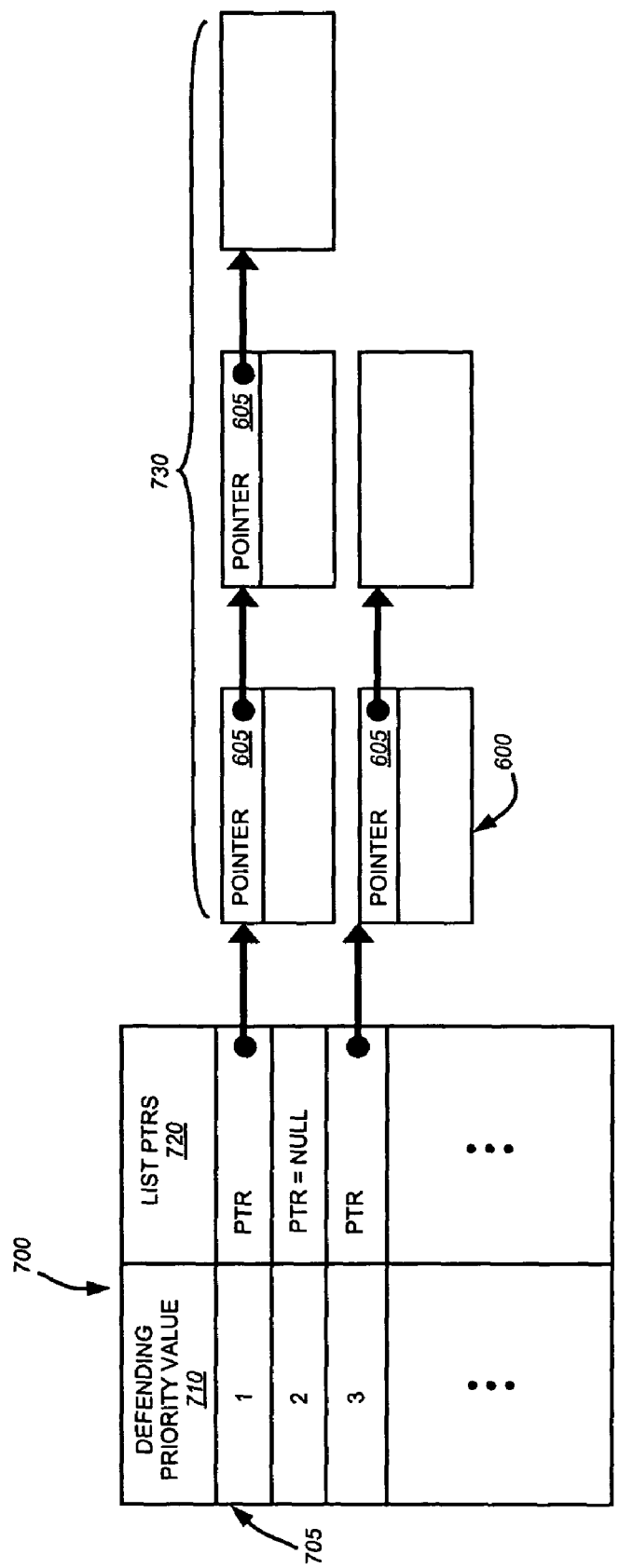
FIG. 7 is a schematic block diagram of an exemplary table that may be used to organize a plurality of reservation state blocks according to their contained defending-priority values.

FIG. 7 illustrates a table 700 that may be used to group reservation state blocks 600 based on their contained defending-priority values 650. Specifically, the table 700 enables the RSVP services 366 to quickly identify a group of state blocks 600 storing the same defending priority value 650. As shown, the table 700 comprises a plurality of entries 705, each entry storing a defending-priority value 710 and a matching list-pointer value 720. The entry's list-pointer value references the head of a corresponding list 730 of reservation state blocks 600, where each state block in the list stores a defending-priority value 650 equal to the entry's defending-priority value 710. Notably, the pointer value 720 may equal a predetermined NULL value, such as zero, when the list is empty. The reservation state blocks in each list are preferably "linked" using their priority-level pointers 605. Furthermore, the reservation state blocks in one or more of the lists 730 may be logically ordered, e.g., from most-recently allocated to least-recently allocated reservation state block.

Figure 8:
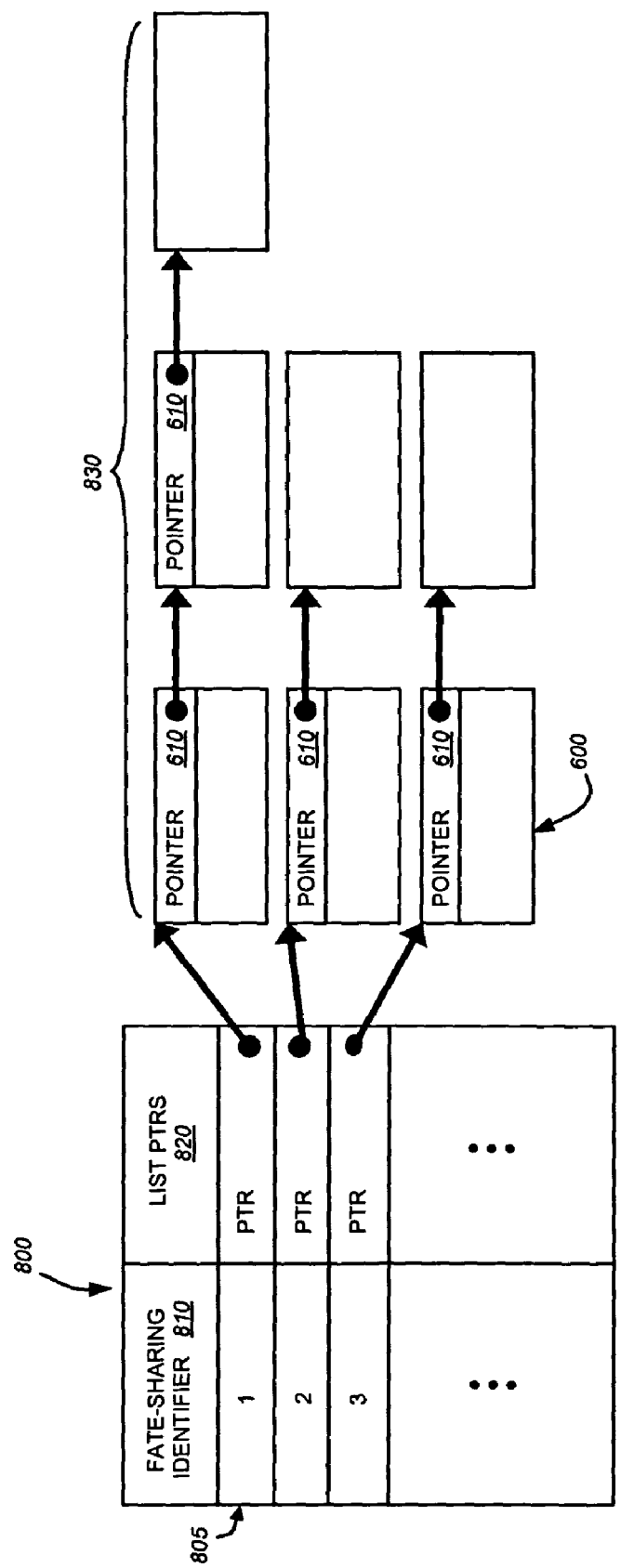
FIG. 8 is a schematic block diagram of an exemplary table that may be used to organize a plurality of reservation state blocks according to their stored fate-sharing identifier values.

FIG. 8 illustrates a table 800 that may be used to group reservation state blocks 600 based on the values of their fate-sharing identifiers 655. The table 800 enables the RSVP services 366 to quickly locate a group of zero or more state blocks 600 whose associated data flows participate in the same fate-sharing group of data flows. The table 800 comprises a plurality of table entries 805, each entry storing a fate-sharing identifier 810, such as a UUID, and a matching list-pointer value 820. The entry's pointer value references the head of a corresponding list 830 of reservation state blocks 600, where each state block in the list stores the same fate-sharing identifier 655. Here, the pointer value 820 may equal a predetermined NULL value, such as zero, when its referenced list is empty. The reservation state blocks 600 in each list are preferably linked using their contained fate-sharing group pointers 610.

In accordance with a first illustrative embodiment, a plurality of network nodes may employ a set of predefined rules for selecting data flows to preempt. The rules are precisely defined and are the same for each of the plurality of nodes. Typically, when a new data flow is being established, a destination network node at the logical end of the data flow sends an upstream Resv request to reserve resources for the new flow. The up-stream nodes along the data flow's data path reserve the requested resources, if the resources are available. However, if the requested resources are not available at a network node along the data path, then that node may preempt an existing, lower-priority data flow to "free" the requested resources. Advantageously, because the network nodes employ the same set of precisely-defined rules, existing data flows to be preempted are selected in a predictable manner.

For example, the nodes may all be configured to preempt the most-recently established data flow. Using these predefined rules, the nodes are more likely to preempt flows participating in the same application instance than in prior implementations; as a result, fewer application instances are disrupted.

While the predefined set of rules increases the likelihood that fewer application instances are disrupted by data-flow preemptions, the rules do not guarantee that the least number of application instances is disrupted. The following paragraphs describe additional techniques to minimize the number of disrupted application instances. For instance, explicit information exchange among the network nodes may be used to further ensure that the number of disrupted application instances is minimized.

Further to the illustrative embodiment, when a data flow in a fate-sharing group is preempted at a network node, the node tears down all its existing data flows in the fate-sharing group. Then, the network node may communicate the FSO of the preempted data flow to the node's neighboring nodes. Notably, the FSO may be communicated in a message formatted in accordance with the RSVP protocol or any other signaling protocol known in the art. For example, the FSO may be communicated to the downstream nodes in a suitably formatted ResvErr message and may be communicated to the upstream nodes in a suitably formatted ResvTear message. In response to receiving the FSO, the neighboring nodes may safely tear down all their existing data flows associated with the received FSO. The neighboring nodes may forward the FSO to their neighbors which, in turn, tear down data flows in the fate-sharing group, and so on. In this way, each node frees network resources, such as bandwidth and memory, previously used to support the fate-sharing flows even before new requests for the resources arrive.

Figure 9A:
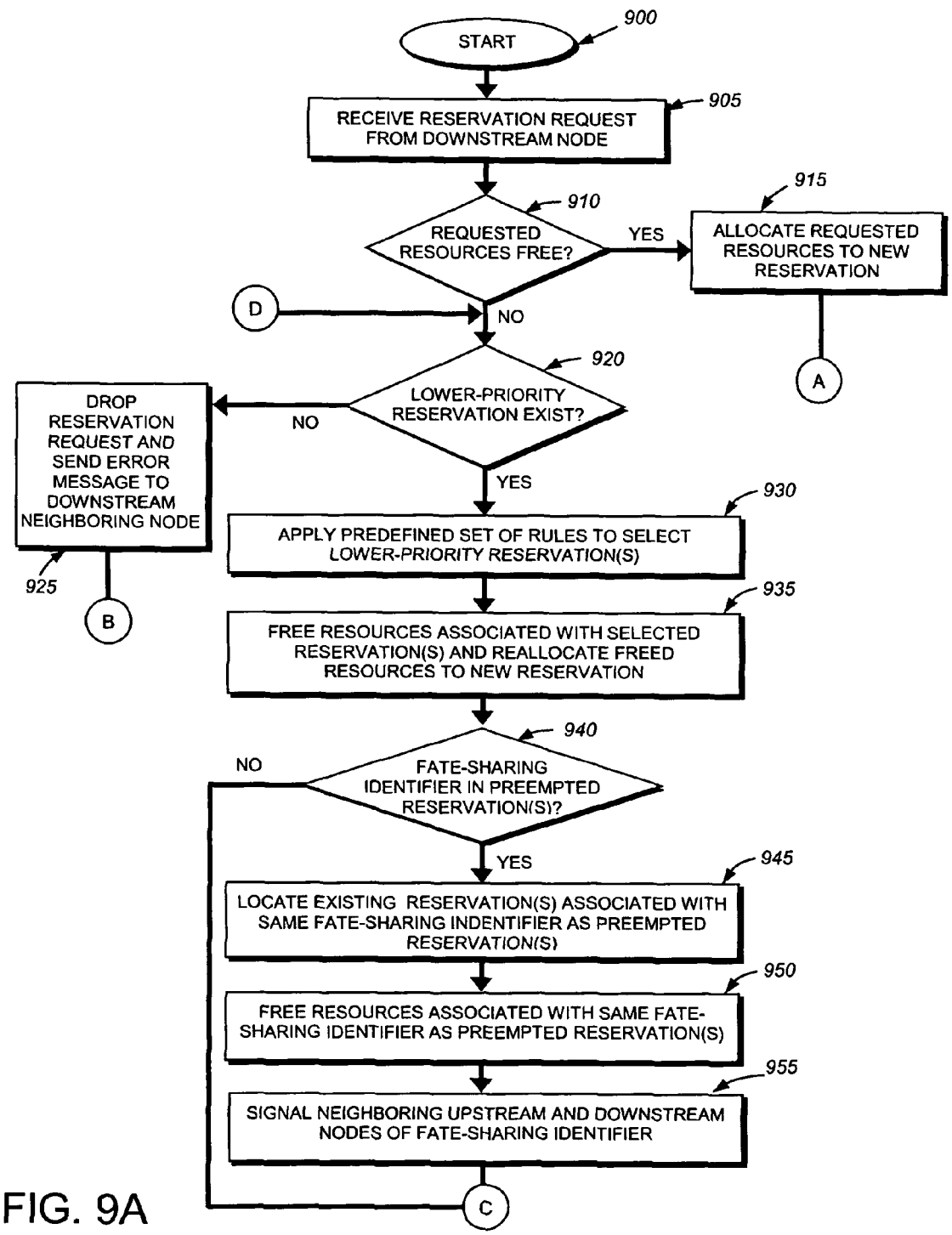
FIGS. 9A-B are a flowchart illustrating a sequence of steps for reserving network resources for a new data flow in accordance with a first illustrative embodiment of the invention.
Figure 9B:
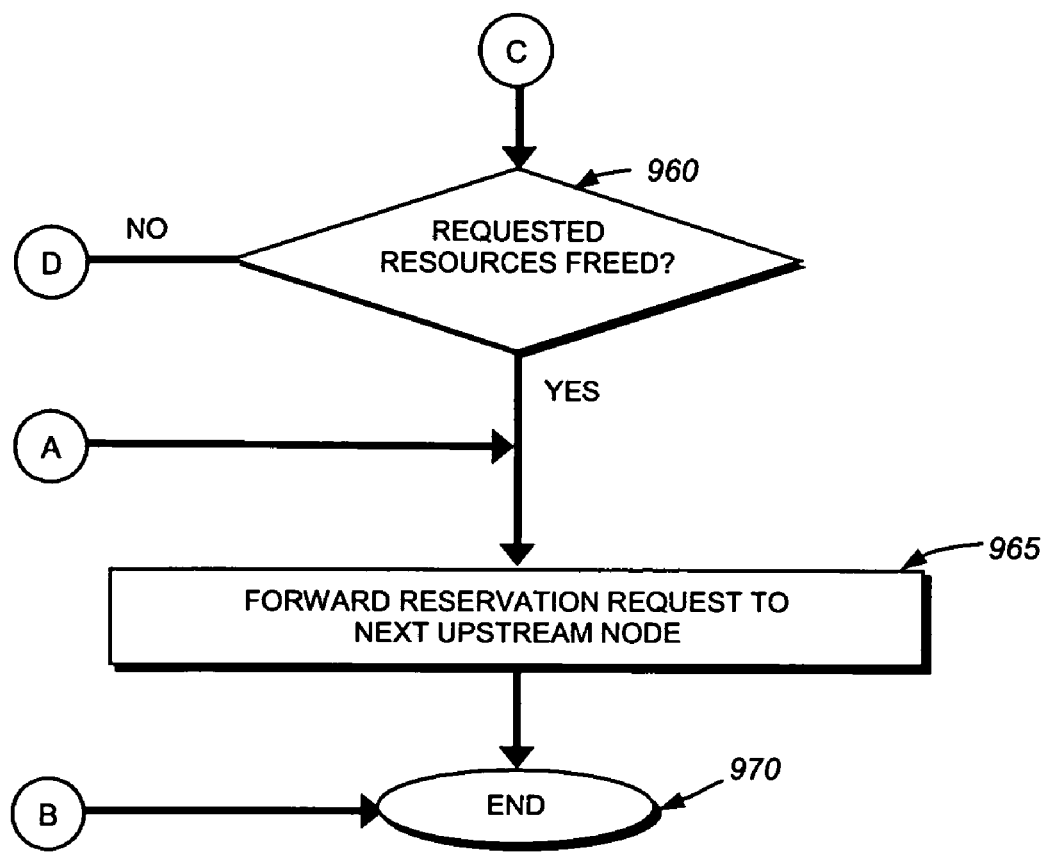

FIGS. 9A-B are a flowchart illustrating a sequence of steps for reserving network resources for a new data flow in accordance with the illustrative embodiment. The sequence begins at step 900 and proceeds to step 905 where a resource reservation request, such as a RSVP Resv request, is received at a network node. Here, it is assumed that a corresponding Path message previously has been disseminated and the network node already has allocated a reservation state block 600 for the new data flow. At step 910, the node determines whether the requested network resources, such as bandwidth and memory, are currently available on the node. If so, then at step 915 the requested resources are allocated for the new data flow and the sequence advances to step 965 where the received reservation request is forwarded to the next upstream node, e.g., identified in the new data flow's reservation state block 600. The sequence ends at step 970.

If the network node determines that the requested resources are not available, then at step 920 the node's RSVP services 366 may determine whether there is an existing lower-priority reservation that may be preempted. In this context, a lower-priority reservation is a reservation whose associated data flow's defending-priority value is less than the preemption-priority value of the new data flow. Illustratively, a lower-priority reservation may be identified using the table 700 which logically organizes reservations' state blocks 600 according to their defending-priority values. In the event that a lower-priority reservation cannot be found, then at step 925 the received reservation request is "dropped" and an error message, such as a RSVP ResvErr message, may be sent down-stream to indicate that the requested resources could not be allocated. Additionally, any resources already reserved for the new data flow may be freed. Then, the sequence ends at step 970.

If one or more lower-priority reservations is located, a predefined set of rules may be applied to the located reservations to select a reservation to preempt, at step 930. As used herein, a reservation is selected for preemption when its associated data flow is selected for preemption (and vice versa). The rules may be configured to select a reservation to preempt according to, e.g., which reservation's corresponding data flow was most-recently (or least-recently) established. As noted, a plurality of network nodes along the new data flow's data path advantageously employ the same set of predefined rules. As such, the rules can be selected so it is more likely that the nodes will preempt a plurality of data flows participating in the same application instance.

Having selected a lower-priority reservation to preempt, at step 935 the RSVP services 366 free the network resources associated with the selected reservation and subsequently reallocate the freed resources for the new data flow. At step 940, the preempted reservation is analyzed to determine whether its corresponding data flow participates in a fate-sharing group. To that end, the reservation state block 600 associated with the preempted reservation may be analyzed to determine whether it contains a fate-sharing identifier 655. If so, then at step 945 the RSVP services locate other existing reservations associated with the same fate-sharing identifier assigned to the preempted reservation. For instance, the fate-sharing identifier may be used as an index into the table 800 to thereby locate a list 830 of reservations associated with data flows in the same fate-sharing group. At step 950, data flows in the fate-sharing group are "torn down" and their reserved network resources are freed.

Next, at step 955, the network node "signals" its neighboring upstream and down-stream nodes to communicate the fate-sharing identifier of the preempted data flow. The fate-sharing identifier may be communicated by a FSO within a message formatted in accordance with the RSVP protocol, or another signaling protocol known in the art. For example, the downstream nodes may be notified using a suitably formatted ResvErr message, while the upstream nodes may be notified using a suitably formatted ResvTear message. The neighboring nodes, in turn, tear down their existing reservations associated with the received fate-sharing identifier and then forward the fate-sharing identifier to their neighbors on the data path, and so forth.

At step 960, the network node determines whether all the requested resources have been freed as a result of the preemption. If so, the received reservation request is forwarded to the next upstream node at step 965 and the sequence ends at step 970. On the other hand, if only a portion of the requested resources have been freed for the new data flow, then the sequence returns to step 920 where additional preemptions may be performed to allocate the remaining requested resources for the new data flow.

In a second illustrative embodiment, when a data flow is preempted at a network node, that node may disseminate a FSO containing the fate-sharing identifier (if one exists) of the preempted data flow and mark all other data flows associated with the same fate-sharing identifier as being "at risk." Similarly, other interconnected network nodes that receive the FSO may mark existing data flows in the fate-sharing group as being at risk. Because the at-risk data flows are not immediately torn down, network resources reserved for the at-risk flows are not freed until the at-risk flows are later preempted or otherwise terminated. As such, it is less likely that resources allocated for the at-risk flows may be freed then subsequently used to establish relatively lower-priority data flows instead of relatively higher-priority data flows.

For instance, suppose a high-priority data flow is to be established at a network node that lacks available resources to establish the new data flow. In accordance with this illustrative embodiment, the node selects an appropriate at-risk data flow to preempt in order to free resources for the high-priority data flow. To that end, the node may implement a data-flow selection policy that selects an at-risk data flow based on, for example, the fate-sharing identifier and preemption-priority value of the data flow that placed the selected at-risk data flow at risk. Once the selected at-risk data flow is preempted, its freed resources are then immediately reallocated to the high-priority data flow rather than to a different, e.g., lower-priority, data flow.

Figure 10:
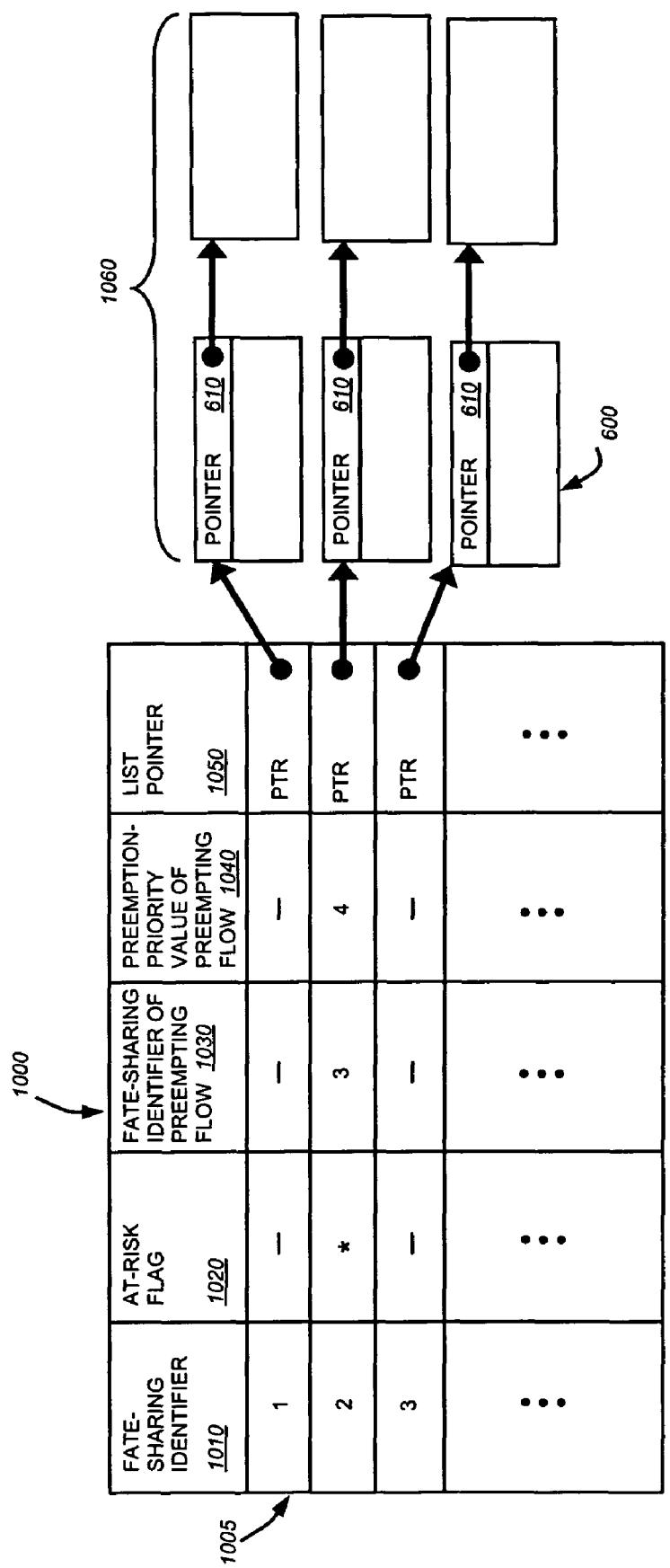
FIG. 10 is a schematic block diagram of an exemplary table that may be used to organize a plurality of reservation state blocks in accordance with a second illustrative embodiment of the invention.

FIG. 10 illustrates a table 1000 that may be used to locate reservations corresponding to at-risk data flows. The table 1000 comprises a plurality of table entries 1005, each entry storing a fate-sharing identifier 1010, an at-risk flag value 1020, a fate-sharing identifier 1030 of a preempting reservation, a preemption-priority value 1040 of a preempting reservation, and a list-pointer value 1050. The entry's list-pointer value references the head of a corresponding list 1060 of reservation state blocks 600, where each state block in the list stores a fate-sharing identifier 655 equal to the entry's fate-sharing identifier 1010. The pointer value 1050 may equal a predetermined NULL value, such as zero, when its referenced list is empty. The reservation state blocks 600 in each list are preferably linked using their contained fate-sharing group pointers 610.

The at-risk flag value 1020 stores a value indicating whether data flows in a group of fate-sharing data flows have been placed at risk. As noted, if any flow in the fate-sharing group is preempted (and thus torn down), then all remaining data flows in the group are considered to be "at risk" of being preempted by new data flows. The at-risk flag value 1020 may be a binary indicator that equals a first value when its associated fate-sharing data flows are at risk, and a second value otherwise. As shown, the at-risk value 1020 is illustrated as an asterisk when its associated group of data flows has been placed at risk. The fate-sharing identifier 1030 and preemption-priority value 1040 respectively correspond to the fate-sharing identifier and preemption-priority value of the preempting data flow that placed the at-risk group of data flows at risk. Notably, if another data flow in the at-risk group of data flows is later preempted, the fate-sharing identifier 1030 and preemption-priority values 1040 may be updated to correspond to the most-recent preempting data flow.

Figure 11A:
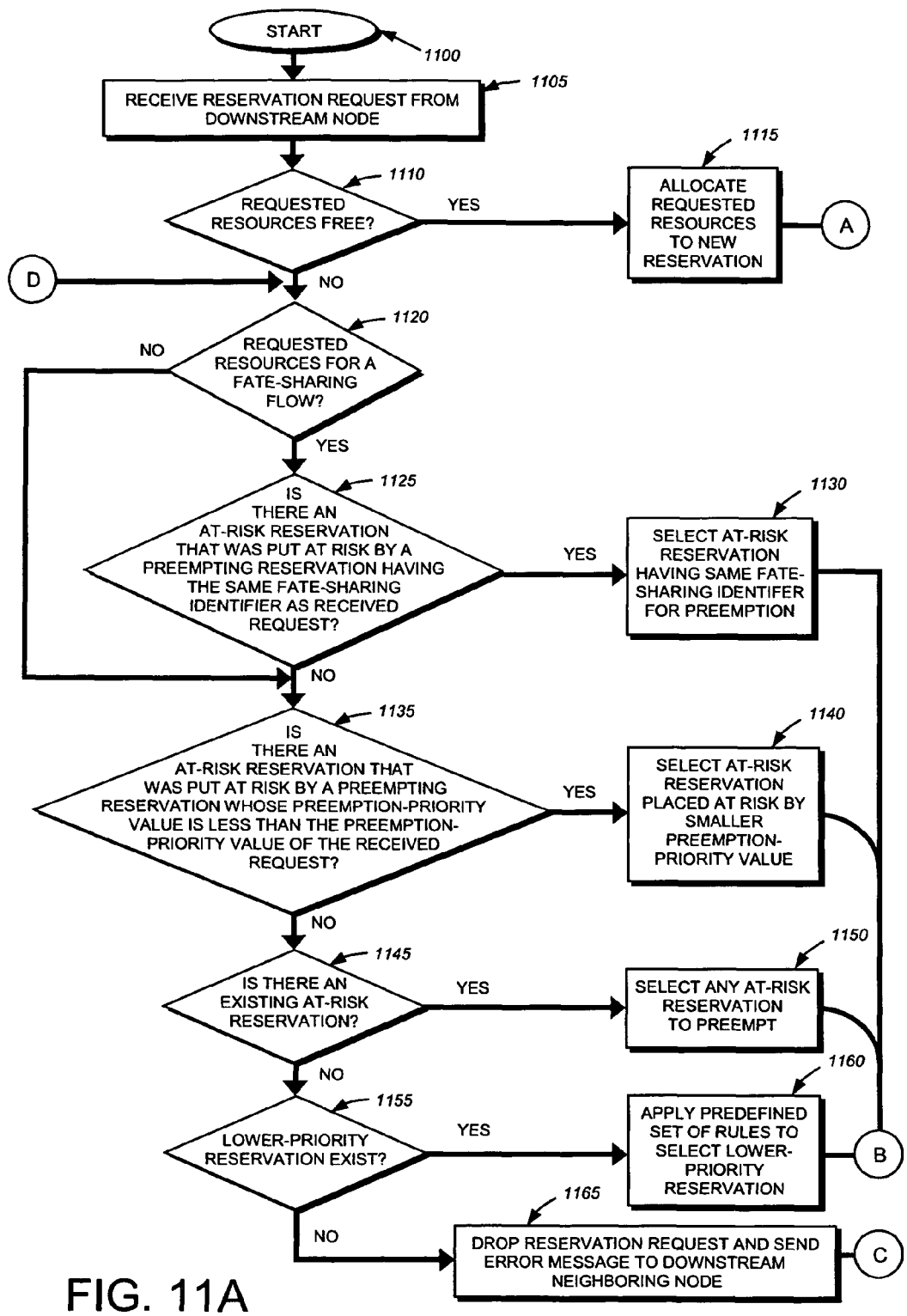
FIGS. 11A-B are flowcharts illustrating a sequence of steps for reserving network resources for a new data flow in accordance with the second illustrative embodiment of the invention.
Figure 11B:
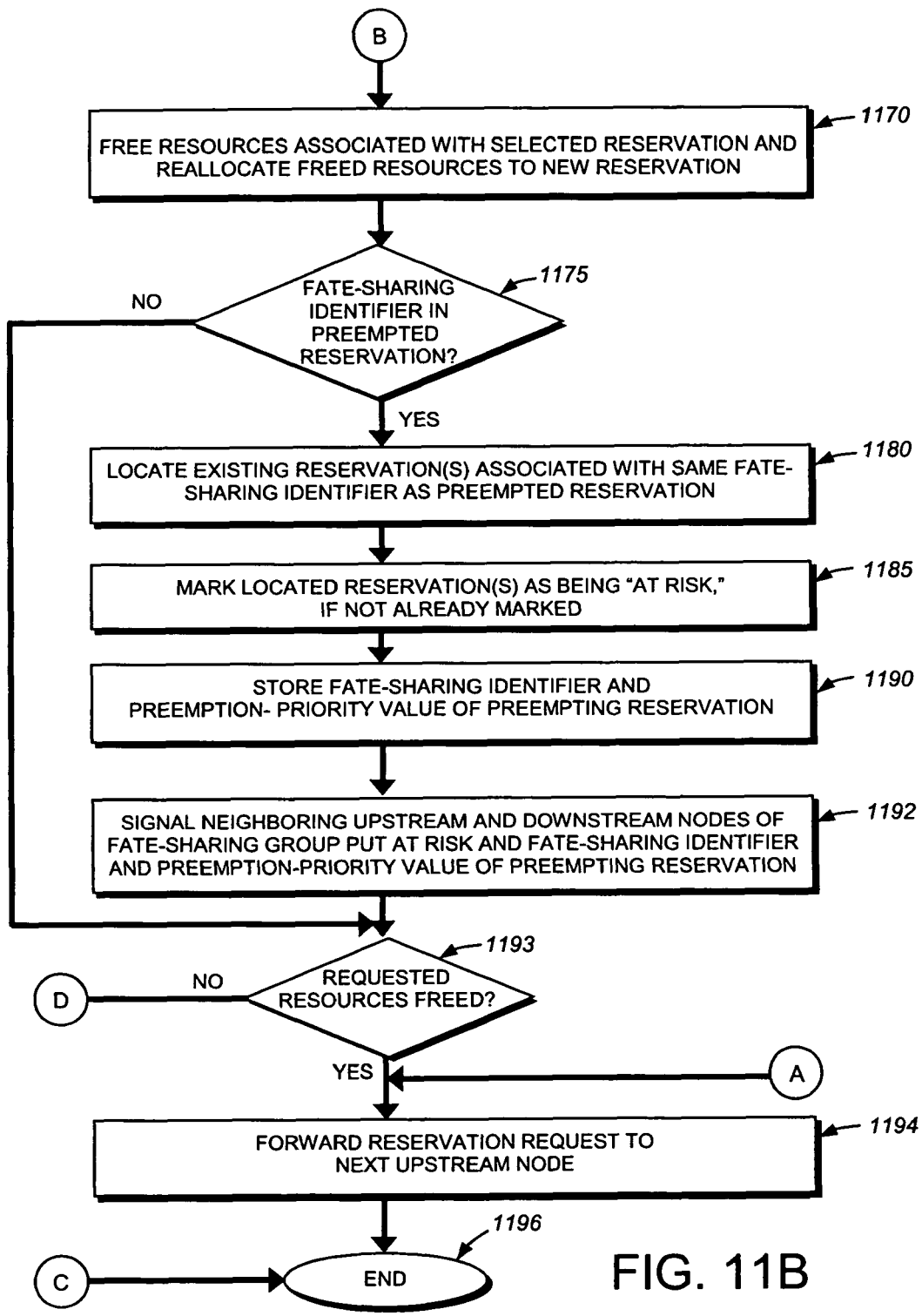

FIGS. 11A-B are flowcharts illustrating a sequence of steps that may be employed by a network node configured to process resource reservation messages, such as RSVP Resv messages, in accordance with the second illustrative embodiment. The sequence starts at step 1100 and proceeds to step 1105 where the network node receives a reservation request from a downstream node. Next, at step 1110, the node determines whether the requested network resources, such as bandwidth and memory, are currently available to allocate to a new data flow. If so, then at step 1115 the requested resources are allocated for the new data flow and the sequence advances to step 1194 where the received reservation request is forwarded to the next upstream node in the new flow's data path. The sequence ends at step 1196.

Steps 1120-1165 illustrate a technique for selecting a reservation to preempt if the requested resources for the new data flow are not available at step 1110. At step 1120, the received reservation request is analyzed to determine whether the new data flow participates in a fate-sharing group of flows. To that end, the request may contain a fate-sharing object or the new data flow already may be associated with a reservation state block 600 containing a fate-sharing identifier 655. If the determination at step 1120 is affirmative, the sequence proceeds to step 1125; otherwise, the sequence advances to step 1135.

At step 1125, the network node determines whether there is an at-risk reservation whose corresponding data flow was placed at risk by a preempting data flow having the same fate-sharing identifier as the new data flow. Illustratively, such an at-risk reservation may be identified by searching the table 1000 or a similar data structure. For instance, the new data flow's fate-sharing identifier may be compared with the table's fate-sharing identifiers 1030 until either a match is found or all the table entries 1005 have been searched. Here, it is assumed that fate-sharing identifiers 1030 only have been entered for table entries 1005 whose associated fate-sharing flows have been placed at risk. If a matching table entry is located, a reservation to preempt is selected from the matching entry's list 1060 of reservations. The sequence then advances to step 1170.

At step 1135, the network node determines whether there is an at-risk reservation that was placed at risk by a preempting data flow whose associated preemption-priority value is less than the preemption-priority value of the new data flow. The preemption-priority value of the new data flow may be identified by the contents of a preemption object 440 in the received request or by a preemption-priority value already associated with the flow, e.g., from a previously-received Path message. In the latter case, the table 1000 or a similar data structure may be used to locate an at-risk reservation corresponding to a data flow that was placed at risk by a preempting data flow having a preemption-priority value 1040 less than the new data flow's preemption-priority value. At step 1140, the reservation located at step 1135 is selected for preemption and the sequence proceeds to step 1170. However, if a suitable reservation cannot be located, then the sequence advances to step 1145.

At step 1145, the network node determines whether there are any existing at-risk reservations, e.g., by searching the at-risk flag values 1020 in the table 1000. Upon locating an existing at-risk reservation, that reservation may be selected for preemption, at step 1150, then the sequences proceeds to step 1170. On the other hand, if no such at-risk reservation can be found, then at step 1155 the node determines whether there is a lower-priority reservation that may be preempted. Illustratively, lower-priority reservations may be identified using the table 700. At step 1160, the node may employ a predefined set of rules to select one of the lower-priority reservations to preempt. However, if existing lower-priority reservations cannot be located, the received reservation request is "dropped" at step 1165 and an error message, such as a RSVP ResvErr message, may be sent downstream to indicate that the requested resources could not be allocated for the new data flow. In this situation, any resources already reserved for the new data flow may be freed and the sequence ends at step 1196.

Having selected a reservation to preempt, the network node subsequently frees network resources associated with the selected reservation, at step 1170. The freed resources are then reallocated for the new data flow. At step 1175, the node determines whether the preempted reservation's state block 600 stores a fate-sharing identifier 655, thereby indicating that the preempted reservation's associated data flow participates in a fate-sharing group of flows. If this determination is negative, the sequence proceeds to step 1194 and the received reservation request is forwarded to the next upstream node. The sequence ends at step 1196.

On the other hand, if the preempted reservation's data flow participates in a fate-sharing group, the remaining flows in that group may be marked "at risk" if they have not already been so marked. More specifically, at step 1180 the network node locates all its existing reservations associated with the preempted reservation's fate-sharing identifier 655, e.g., using the fate-sharing identifier 655 as an index into the table 1000 to locate an entry 1005 having a matching fate-sharing identifier 1010. At step 1185, the matching entry's at-risk flag value 1020 is set equal to a value indicating that data flows in the fate-sharing group are now placed at risk. Of course, those skilled in the art will understand that if the at-risk flag value already indicates that the flows are at risk, then the at-risk flag value 1020 need not be changed. Next, at step 1190, the fate-sharing identifier and preemption-priority value corresponding to the new data flow are respectively stored as the entry's fate-sharing identifier 1030 and preemption-priority value 1040. In some cases, the new data flow's fate-sharing identifier and preemption-priority value may overwrite previously stored values.

At step 1192, the network node "signals" its neighboring upstream and down-stream nodes so as to communicate to them a message containing the fate-sharing identifier of the preempted data flow, the fate-sharing identifier of the new (preempting) data flow and the preemption-priority value of the new data flow. The neighboring nodes then update their local tables 1000 based on the contents of this received message and then forward the message to their neighboring nodes, etc. Notably, the message may be formatted in accordance with the RSVP protocol or other signaling protocols known in the art. At step 1193, the network node determines whether all the requested resources have been freed as a result of the preemption. If so, the received reservation request is forwarded to the next upstream node along the new data flow's data path, at step 1194, then the sequence ends at step 1196. However, if only a portion of the requested resources have been freed, then the sequence returns to step 1120 where additional preemptions may be performed to allocate the remaining requested resources for the new data flow.

Figure 12:
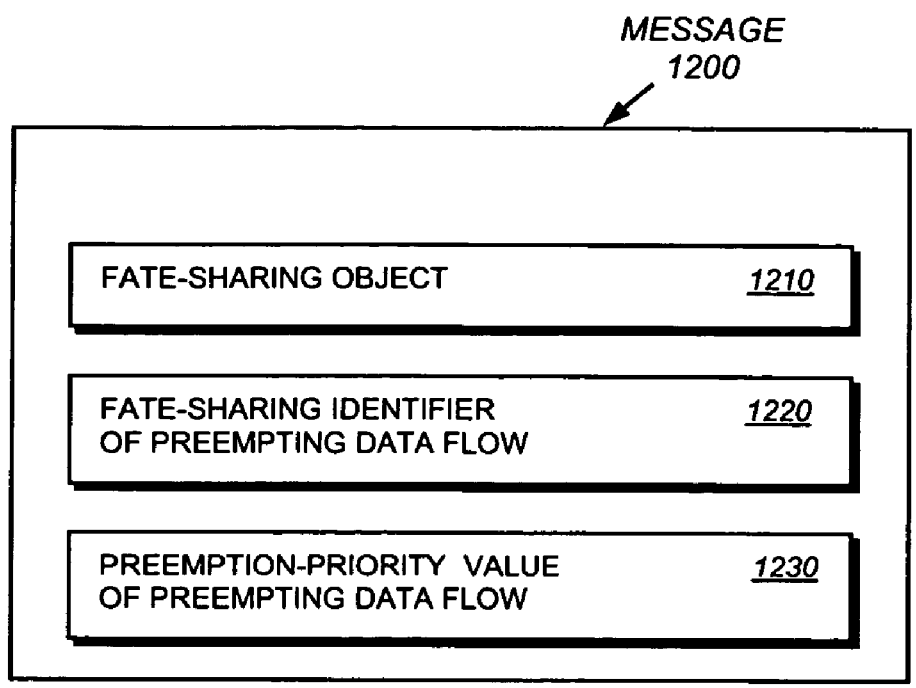
FIG. 12 is a schematic block diagram of a message that advantageously may be disseminated among a plurality of interconnected network nodes to communicate information associated with a preempted fate-sharing data flow.

FIG. 12 is a schematic block diagram illustrating a message 1200 that a network node may send (at step 1192) so neighboring nodes can update the contents of their tables 1000. The message includes, among other things, a fate-sharing object 1210, a fate-sharing identifier 1220 of a preempting data flow and a preemption-priority value 1230 of a preempting flow. Upon receiving the message 1200, the fate-sharing identifier stored in the FSO 1210 may be used to index an entry 1005 in the receiving node's table 1000. The indexed entry's at-risk flag value 1020 may be set equal to a value indicating that fate-sharing data flows associated with state blocks 600 in the entry's referenced list 1060 are at risk. The indexed entry's fate-sharing identifier 1030 and preemption-priority value 1040 then may be respectively overwritten with the values 1220 and 1230 contained in the received message 1200. The receiving node may forward the message 1200 to its neighboring nodes, which then update the contents of their tables 1000, and so on.

The foregoing has been a detailed description of illustrative embodiments of the invention. Various modifications and additions can be made without departing from the spirit and scope of the invention. For example, while the illustrative embodiments have been described with respect to the RSVP protocol, the present invention more generally may be employed using various signaling and/or reservation protocols in which preemption may occur. The inventive technique is broadly applicable to deployments in which a new data flow may preempt one or more existing data flows to free network resources. Further, those skilled in the art will appreciate that variations of the illustrative embodiments may substitute different types of signaling messages without loss of generality.

It is expressly contemplated that the invention may be implemented in source and destination network nodes along a data path, as well as in intermediate network nodes on the data path. Here, it is noted that not every network node along a data path may be configured in accordance with the present invention. That is, some nodes along the data path may be, e.g., non-RSVP configured nodes.

It is also expressly contemplated that the tables 700, 800 and 1000 may be substituted with functionally equivalent searchable data structures, such as tree structures, hash tables, etc. Furthermore, one or more of the tables may be combined to form a larger table. The tables may be removed altogether in embodiments where the tables' contents can be reconstructed using multi-key sorting techniques known in the art. In addition, while the illustrative embodiments assume a data flow can participate in a single fate-sharing group, those skilled in the art will understand that, in alternative embodiments, a data flow may participate in a plurality of different fate-sharing groups. In this scenario, a single data flow may be associated with more than one fate-sharing identifier.

Although the routing process 364 and RSVP services 366 in the illustrative embodiments reside in the memory 360, it is expressly contemplated that the routing process and RSVP services, or portions thereof, may reside on a network interface 210, such as a line card. Furthermore, execution of the routing process and/or RSVP services may be distributed among a plurality of processors, some of which may be located, e.g., on the network interfaces 210 and/or in the supervisor engine 300. Also, those skilled in the art will appreciate that at least some portions of the routing process 364 and RSVP services 366 may be directly incorporated or linked into the operating system 362, or alternatively may be embodied as user-level processes that execute in conjunction with the operating system.

It is expressly contemplated that the teachings of this invention can be implemented as software, including a computer-readable medium having program instructions executing on a computer, hardware, firmware, or a combination thereof. The inventive technique therefore may be implemented in various combinations of hardware and/or software. Accordingly, this description is meant to be taken only by way of example and not to otherwise limit the scope of the invention.

What is claimed is:

1. A method for a network node in a computer network to allocate network resources for a new data flow, the method comprising:
   receiving a request to reserve network resources for the new data flow;
   determining whether the requested network resources are available;
   if the requested resources are determined to be unavailable, performing, by a processor, the steps of:
      selecting an existing data flow to preempt from a plurality of existing data flows that have lower priority values than a priority value associated with the new data flow, the selecting based on a predefined set of rules, the predefined set of rules being common to a plurality of nodes in the computer network, the predefined set of rules to consistently select the same existing data flow at each node of the plurality of nodes;
      determining whether the selected data flow participates in a fate-sharing group of data flows, where utility of data flows in the fate-sharing group depends on all data flows in the fate-sharing group being operational;
      if the selected data flow is determined to participate in a fate-sharing group of data flows, preempting every data flow in the fate-sharing group, otherwise preempting the selected data flow, thereby freeing network resources previously reserved for the data flows in the fate-sharing group or, the selected data flow, as the case may be; and
   reallocating at least some of the freed network resources for the new data flow.

2. The method of claim 1, further comprising:
   allocating the requested resources to the new data flow if the requested resources are determined to be available.

3. The method of claim 1, wherein the step of determining whether the selected data flow participates in a fate-sharing group further comprises:
   locating a fate-sharing identifier associated with the selected data flow, the fate-sharing identifier corresponding to the fate-sharing group.

4. The method of claim 3, wherein the fate-sharing identifier is a universal unique identifier (UUID).

5. The method of claim 1, further comprising:
   forwarding the received request to an upstream network node in the computer network.

6. The method of claim 1, wherein the request is a RSVP Reservation (Resv) message.

7. The method of claim 1, wherein the network node is an intermediate network node.

8. The method of claim 1, wherein the request is generated in the network node.

9. The method of claim 1, wherein the selected data flow is associated with a lower defending-priority value than a preemption-priority value associated with the new data flow.

10. The method of claim 1, further comprising:
    dropping the received request if a preemption-priority value associated with the new data flow is less than or equal to defending-priority values of all existing data flows; and
    transmitting an error message to the network node's neighboring downstream node to inform the neighboring node that the requested network resources could not be allocated.

11. A method for a network node in a computer network to allocate network resources for a new data flow, the method comprising:
    receiving a request to reserve network resources for the new data flow;
    determining whether the requested network resources are available;
    if the requested resources are determined to be unavailable, performing, by a processor of the network node, the steps of:
       selecting an existing data flow to preempt by determining an existing "at-risk" data flow and selecting the existing at-risk date flow, the existing at-risk data flow being a data flow that is a member of a fate-sharing group of data flows where at least one data flow in the fate-sharing group has already been preempted and where utility of the data flows in the fate-sharing group depends on all the data flows in the fate-sharing group being operational, wherein each data flow in the fate-sharing group traverses a plurality of links;
       preempting the selected at-risk data flow, thereby freeing network resources previously reserved for the selected at-risk data flow; and reallocating at least some of the freed network resources for the new data flow.

12. The method of claim 11, wherein the step of selecting an existing at-risk data flow to preempt further comprises:
   determining whether the new data flow participates in a fate-sharing group of data flows;
   if the new data flow is determined to participate in a fate-sharing group of data flows, locating an existing at-risk data flow that was placed at risk by a preempting data flow participating in the same fate-sharing group as the new data flow; and
   selecting the located at-risk data flow to preempt.

13. The method of claim 12, wherein the step of locating an existing at-risk data flow further comprises:
   for each at-risk data flow, associating, with the at-risk data flow, a fate-sharing identifier of a preempting data flow that placed the at-risk data flow at risk;
   comparing a fate-sharing identifier associated with the new data flow with the fate-sharing identifiers associated with the preempting data flows; and
   locating an existing at-risk data flow having a fate-sharing identifier associated with a preempting data flow which is equal to the fate-sharing identifier associated with the new data flow.

14. The method of claim 13, wherein each fate-sharing identifier is a universal unique identifier (UUID).

15. The method of claim 11, wherein the step of selecting an existing at-risk data flow further comprises:
   for each at-risk data flow, associating a preemption-priority value of a preempting data flow that placed the at-risk data flow at risk;
   comparing a preemption-priority value associated with the new data flow with the preemption-priority values associated with the preempting data flows;
   locating an existing at-risk data flow having a preemption-priority value associated with a preempting data flow which is less than the preemption-priority value associated with the new data flow; and
   selecting the located at-risk data flow to preempt.

16. The method of claim 11, further comprising:
   if an existing at-risk data flow can not be found, performing the steps of
      selecting an existing data flow to preempt based on a predefined set of rules, the selected data flow not being identified as an at-risk data flow;
      preempting the selected data flow, thereby freeing network resources previously reserved for the selected data flow; and
      reallocating the freed network resources for the new data flow.

17. The method of claim 11, further comprising:
   forwarding the received request to an upstream network node in the computer network.

18. The method of claim 11, wherein the request is a RSVP Reservation (Resv) message.

19. The method of claim 11, wherein the network node is an intermediate network node.

20. The method of claim 11, wherein the request is generated in the network node.

21. A network node configured to allocate network resources for a new data flow, the network node comprising:
   means for receiving a request to reserve network resources for the new data flow;
   means for determining that the requested network resources are unavailable;
   means for selecting an existing data flow to preempt from a plurality of existing data flows that have lower priority values than a priority value associated with the new data flow, the selecting based on a predefined set of rules, the predefined set of rules being common to a plurality of nodes in the computer network, the predefined set of rules to consistently select the same existing data flow at each node of the plurality of nodes;
   means for determining whether the selected data flow participates in a fate-sharing group of data flows, where utility of data flows in the fate-sharing group depends on all data flows in the fate-sharing group being operational; and
   means for preempting every data flow in the fate-sharing group if the selected data flow is determined to participate in a fate-sharing group of data flows, and otherwise preempting the selected data flow, thereby freeing network resources previously reserved for the data flows in the fate-sharing group or, the selected data flow, as the case may be; and
   means for reallocating at least some of the freed network resources for the new data flow.

22. The network node of claim 21, further comprising:
   means for cooperating with a plurality of other network nodes to employ the same predefined set of rules for selecting data flows to preempt.

23. A network node configured to allocate network resources for a new data flow, the network node comprising:
   means for receiving a request to reserve network resources for the new data flow;
   means for determining that the requested network resources are unavailable;
   means for selecting an existing data flow to preempt by determining an "at-risk" data flow and selecting the existing at-risk date flow, the existing at-risk data flow being a data flow that is a member of a fate-sharing group of data flows where at least one data flow in the fate sharing group has already been preempted and where utility of the data flows in the fate sharing group depends on all the data flows in the fate sharing group being operational, wherein each data flow in the fate-sharing group traverses a plurality of links;
   means for preempting the selected at-risk data flow, thereby freeing network resources previously reserved for the selected at-risk data flow; and
   means for reallocating at least some of the freed network resources for the new data flow.

24. A network node configured to allocate network resources for a new data flow, the network node comprising:
   a processor; and
   a memory configured to store instructions executable by the processor to:
      receive a request to reserve network resources for the new data flow;
      determine that the requested network resources are unavailable;
      select an existing data flow to preempt from a plurality of existing data flows that have lower priority values than a priority value associated with the new data flow, the selecting based on a predefined set of rules, the predefined set of rules being common to a plurality of nodes in the computer network, the predefined set of rules to consistently select the same existing data flow at each node of the plurality of nodes;
      determine whether the selected data flow participates in a fate-sharing group of data flows, where utility of data flows in the fate-sharing group depends on all data flows in the fate-sharing group being operational;

if the selected data flow is determined to participate in a fate-sharing group of data flows, preempt every data flow in the fate-sharing group, otherwise preempt the selected data flow, thereby freeing network resources previously reserved for data flows in the fate-sharing group or, the selected data flow, as the case may be; and reallocate at least some of the freed network resources for the new data flow.

25. A network node configured to allocate network resources for a new data flow, the network node comprising:

a processor; and a memory configured to store instructions executable by the processor to:

receive a request to reserve network resources for the new data flow;

determine that the requested network resources are unavailable;

select an existing data flow to preempt determining existing "at-risk" data flow and selecting the existing at-risk date flow, the existing at-risk data flow being a data flow that is a member of a fate-sharing group of data flows where at least one data flow in the fate-sharing group has already been preempted and where utility of the data flows in the fate sharing group depends on all the data flows in the fate sharing group being operational, wherein each data flow in the fate-sharing group traverses a plurality of links;

preempt the selected at-risk data flow, thereby freeing network resources previously reserved for the selected at-risk data flow; and reallocate at least some of the freed network resources for the new data flow.

* * * * *